(12) United States Patent
Nicolson et al.

(10) Patent No.: US 8,892,862 B2
(45) Date of Patent: Nov. 18, 2014

(54) SECURE BOOT METHOD FOR EXECUTING A SOFTWARE COMPONENT INCLUDING UPDATING A CURRENT INTEGRITY MEASUREMENT BASED ON WHETHER THE SOFTWARE COMPONENT IS ENABLED

(75) Inventors: Kenneth Alexander Nicolson, Hyogo (JP); Hideki Matsushima, Osaka (JP); Hisashi Takayama, Osaka (JP); Takayuki Ito, Osaka (JP); Tomoyuki Haga, Nara (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 377 days.

(21) Appl. No.: 13/375,047

(22) PCT Filed: Jul. 1, 2010

(86) PCT No.: PCT/JP2010/004331
§ 371 (c)(1),
(2), (4) Date: Nov. 29, 2011

(87) PCT Pub. No.: WO2011/001685
PCT Pub. Date: Jan. 6, 2011

(65) Prior Publication Data
US 2012/0102313 A1    Apr. 26, 2012

(30) Foreign Application Priority Data

Jul. 1, 2009   (JP) ................................. 2009-157363

(51) Int. Cl.
*G06F 9/00* (2006.01)
*G06F 21/00* (2013.01)
*G06F 21/57* (2013.01)

(52) U.S. Cl.
CPC .................................... *G06F 21/575* (2013.01)
USPC .................. 713/2; 713/164; 713/189; 713/1; 717/174; 717/177

(58) Field of Classification Search
CPC ...... G06F 21/00; G06F 9/4406; G06F 9/4416
USPC ........................... 713/2, 164, 189, 1; 717/174
See application file for complete search history.

(56) References Cited

U.S. PATENT DOCUMENTS

| 5,987,605 A | 11/1999 | Hill et al. |
| 6,477,648 B1 | 11/2002 | Schell et al. |

(Continued)

FOREIGN PATENT DOCUMENTS

| JP | 2006-323814 | 11/2006 |
| JP | 2008-77548 | 4/2008 |

(Continued)

OTHER PUBLICATIONS

International Search Report issued Oct. 6, 2010 in International (PCT) Application No. PCT/JP2010/004331.

(Continued)

*Primary Examiner* — Thomas Lee
*Assistant Examiner* — Aurel Prifti
(74) *Attorney, Agent, or Firm* — Wenderoth, Lind & Ponack, L.L.P.

(57) ABSTRACT

A method for executing a predetermined software component which is verifiable against integrity measurements, the method including (i) providing a first mapping from logical identifiers to software component enabled status flags, (ii) providing a second mapping from the logical identifiers and previous software component statuses information to actual integrity measurement certificates containing verification data, (iii) looking up the first mapping for a given logical identifier identifying the predetermined software component to get a status flag indicating whether the predetermined software component is enabled, (iv) if the status flag indicates that the predetermined software component is not enabled, updating a current integrity measurement stored within a disabled integrity measurement certificate, and (v) if the status flag indicates that the predetermined software component is enabled and verification of the predetermined software component is successful, updating a current integrity measurement stored within an integrity measurement certificate.

7 Claims, 26 Drawing Sheets

(56) References Cited

U.S. PATENT DOCUMENTS

| | | |
|---|---|---|
| 6,691,225 B1 | 2/2004 | Suffin |
| 7,380,275 B2 | 5/2008 | Srinivasan et al. |
| 7,725,703 B2 | 5/2010 | Hunter et al. |
| 8,555,049 B2 | 10/2013 | Takayama et al. |
| 8,566,606 B2 | 10/2013 | Movva et al. |
| 2004/0003288 A1 | 1/2004 | Wiseman et al. |
| 2005/0138414 A1 | 6/2005 | Zimmer et al. |
| 2006/0155988 A1* | 7/2006 | Hunter et al. ............ 713/164 |
| 2006/0212750 A1 | 9/2006 | Denninghoff et al. |
| 2006/0294595 A1* | 12/2006 | Drihem ..................... 726/27 |
| 2007/0067617 A1 | 3/2007 | Tarkkala |
| 2007/0174832 A1* | 7/2007 | Brehm et al. ............ 717/174 |
| 2008/0005806 A1 | 1/2008 | Alve |
| 2008/0052705 A1* | 2/2008 | Kaufman et al. ......... 717/174 |
| 2008/0301672 A1* | 12/2008 | Rao et al. ................ 717/177 |
| 2009/0132829 A1 | 5/2009 | Ohhashi |
| 2009/0307487 A1 | 12/2009 | Movva et al. |
| 2010/0011225 A1* | 1/2010 | Takayama ................ 713/189 |
| 2010/0146250 A1* | 6/2010 | Bergerson et al. ............ 713/1 |
| 2010/0178977 A1* | 7/2010 | Kim et al. ................. 463/25 |
| 2010/0180343 A1* | 7/2010 | Maeda et al. .............. 726/23 |
| 2010/0185845 A1* | 7/2010 | Takayama et al. ............ 713/2 |
| 2010/0318781 A1 | 12/2010 | Nicolson et al. |
| 2011/0066838 A1* | 3/2011 | Takayama et al. ............ 713/2 |

FOREIGN PATENT DOCUMENTS

| | | |
|---|---|---|
| JP | 2009-129061 | 6/2009 |
| JP | 2009-534749 | 9/2009 |
| WO | 01/80007 | 10/2001 |
| WO | 2007/031834 | 3/2007 |
| WO | 2007/124091 | 11/2007 |
| WO | 2009/044533 | 4/2009 |
| WO | 2009/096181 | 8/2009 |
| WO | WO 2009096181 A2 * | 8/2009 |

OTHER PUBLICATIONS

Written Opinion of the International Searching Authority issued Oct. 6, 2010 in International (PCT) Application No. PCT/JP2010/004331.

Patent Cooperation Treaty (PCT) International Preliminary Report on Patentability issued Sep. 20, 2011 in International (PCT) Application No. PCT/JP2010/004331.

TCG Mobile Reference Architecture version 1.0, Jun. 12, 2007.

TCG Mobile Trusted Module Specification version 1.0, Jun. 12, 2007.

* cited by examiner

[Fig. 1]
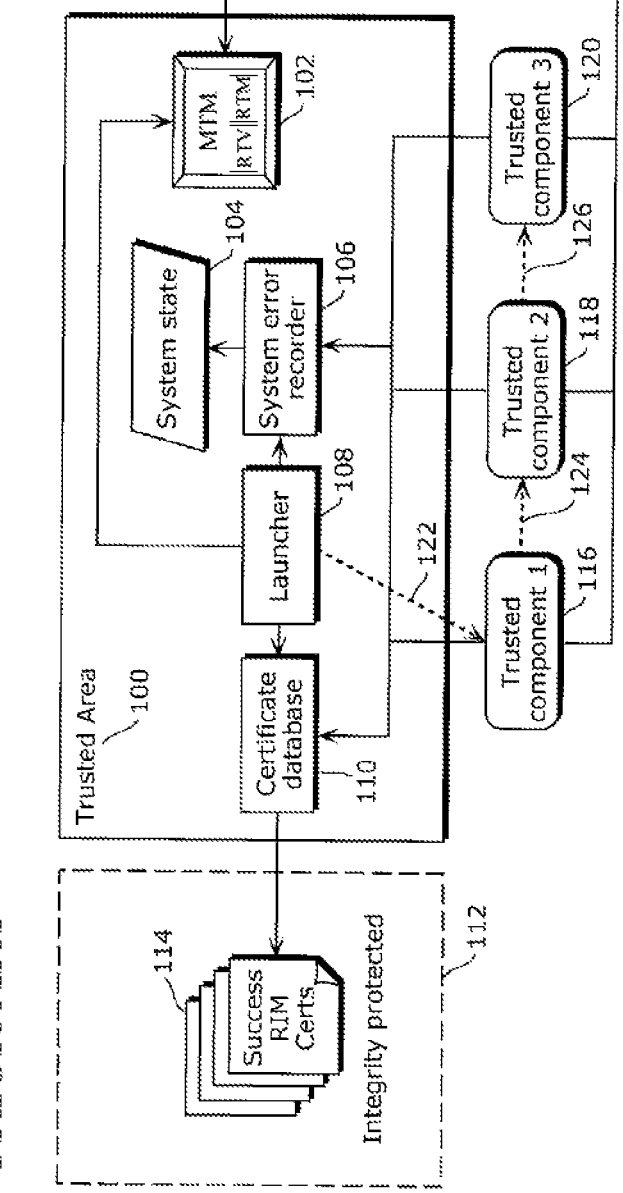

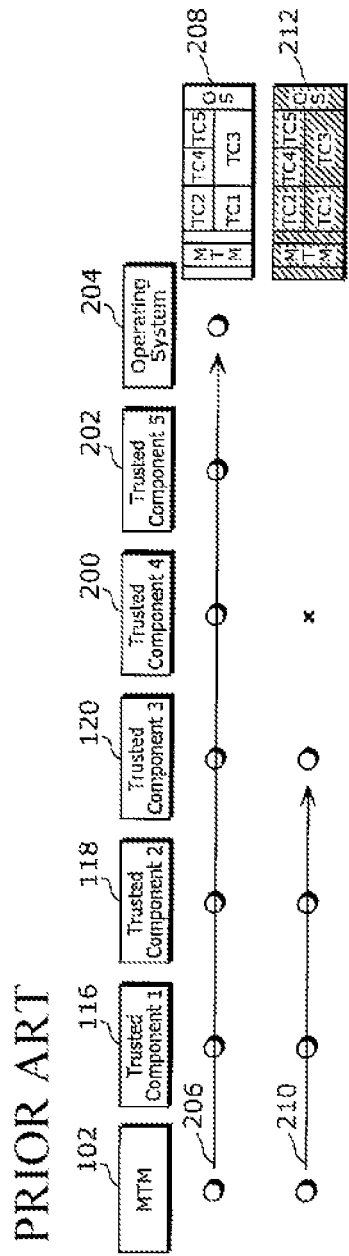

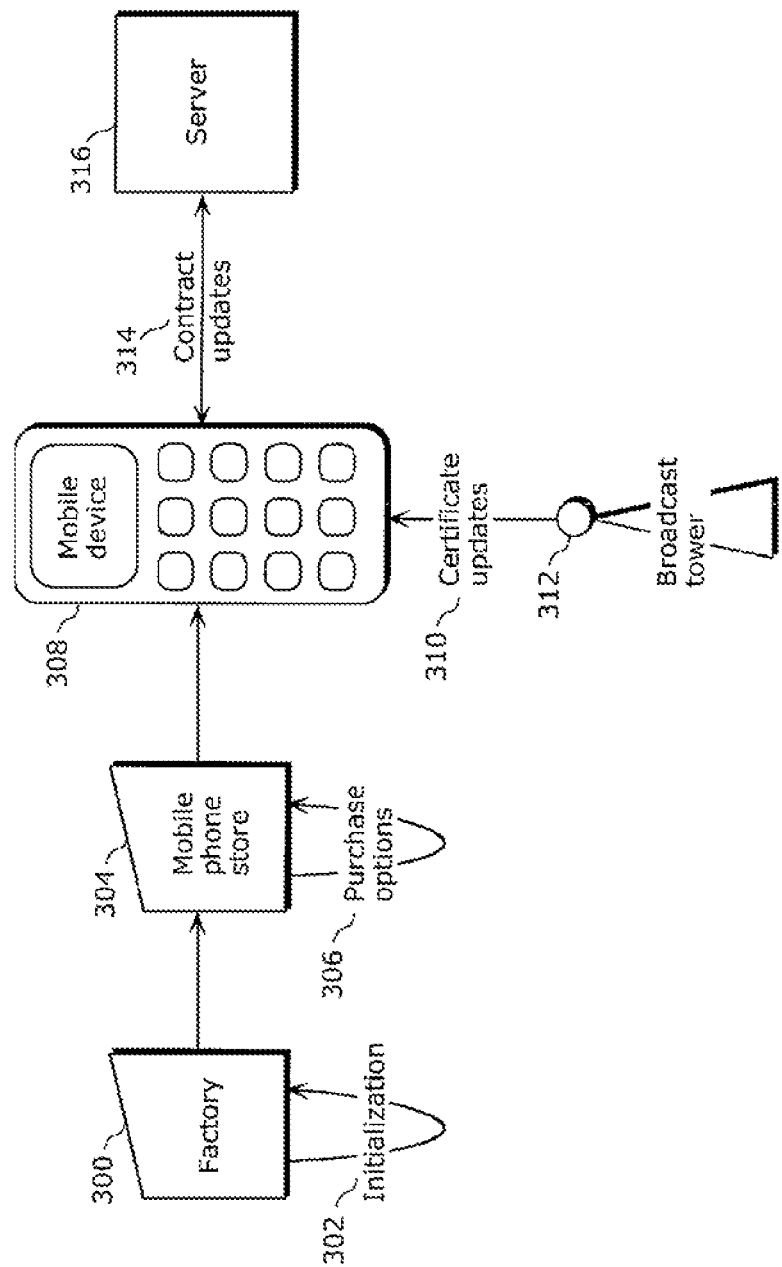
[Fig. 3]

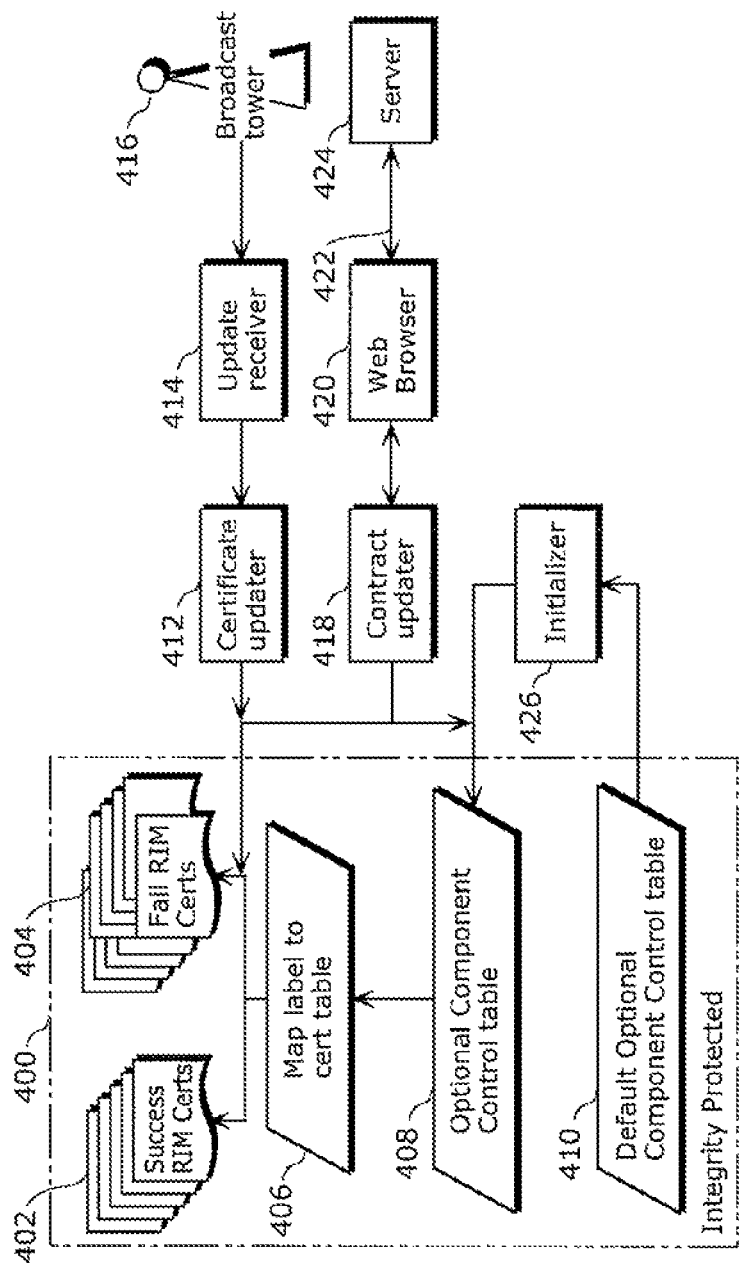
[Fig. 4]

[Fig. 5]
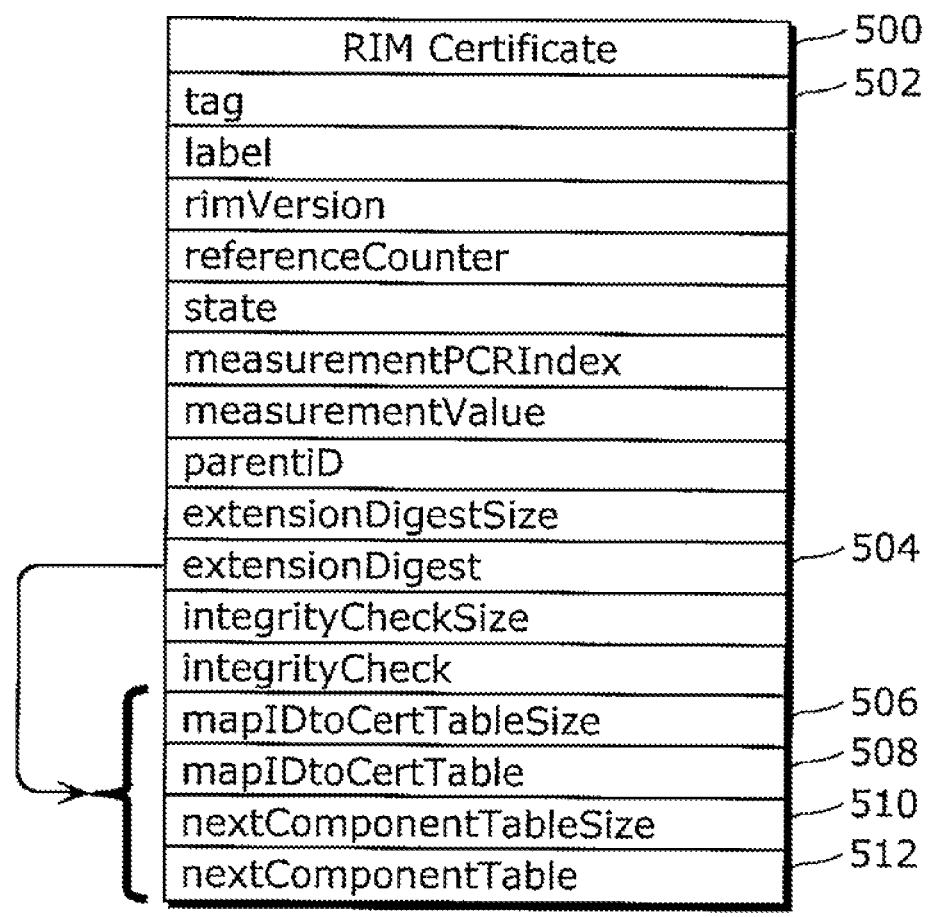

[Fig. 6]

| Logical certificate label | Dependent trusted component status | Dependent trusted component mask | RIM Certificate label |
|---|---|---|---|
| Trusted Component 2 Verify | Trusted Component 1 OK | Trusted Component 1 | cmp1_v01 |
| Trusted Component 2 Verify | Trusted Component 1 FAILED | Trusted Component 1 | cmp1_v02 |
| Trusted Component 3 Verify | Trusted Component 1 OK, Trusted Component 2 OK | Trusted Component 1, Trusted Component 2 | cmp2_v01 |
| Trusted Component 3 Verify | Trusted Component 1 FAILED, Trusted Component 2 OK | Trusted Component 1, Trusted Component 2 | cmp2_v02 |
| Trusted Component 3 Verify | Trusted Component 1 OK, Trusted Component 2 OK | Trusted Component 1, Trusted Component 2 | cmp2_v03 |

[Fig. 7]

| Failed trusted component | Dependent trusted component status | Dependent trusted component mask | Trusted component to launch |
|---|---|---|---|
| Trusted Component 1 | None | None | Trusted Component 2 |
| Trusted Component 2 | Trusted Component 1 FAILED | Trusted Component 1 | Abort Boot |
| Trusted Component 2 | Trusted Component 1 OK | Trusted Component 1 | Trusted Component 3 |
| Trusted Component 3 | None | None | Operating System |
| Operating System | | | Abort Boot |

| | |
|---|---|
| Optional Component Control | —408 |
| RIMProtectValue | —802 |
| Logical Certificate Label 1 | —804 |
| Enabled flag 1 | —806 |
| Logical Certificate Label 2 | |
| Enabled flag 2 | |
| Logical Certificate Label 3 | |
| Enabled flag 3 | |
| ⋮ | |
| -1 (End of table signal value) | —808 |
| FALSE (dummy value) | —810 |
| Cryptographic signature | —812 |

814 — Logical Certificate Label table

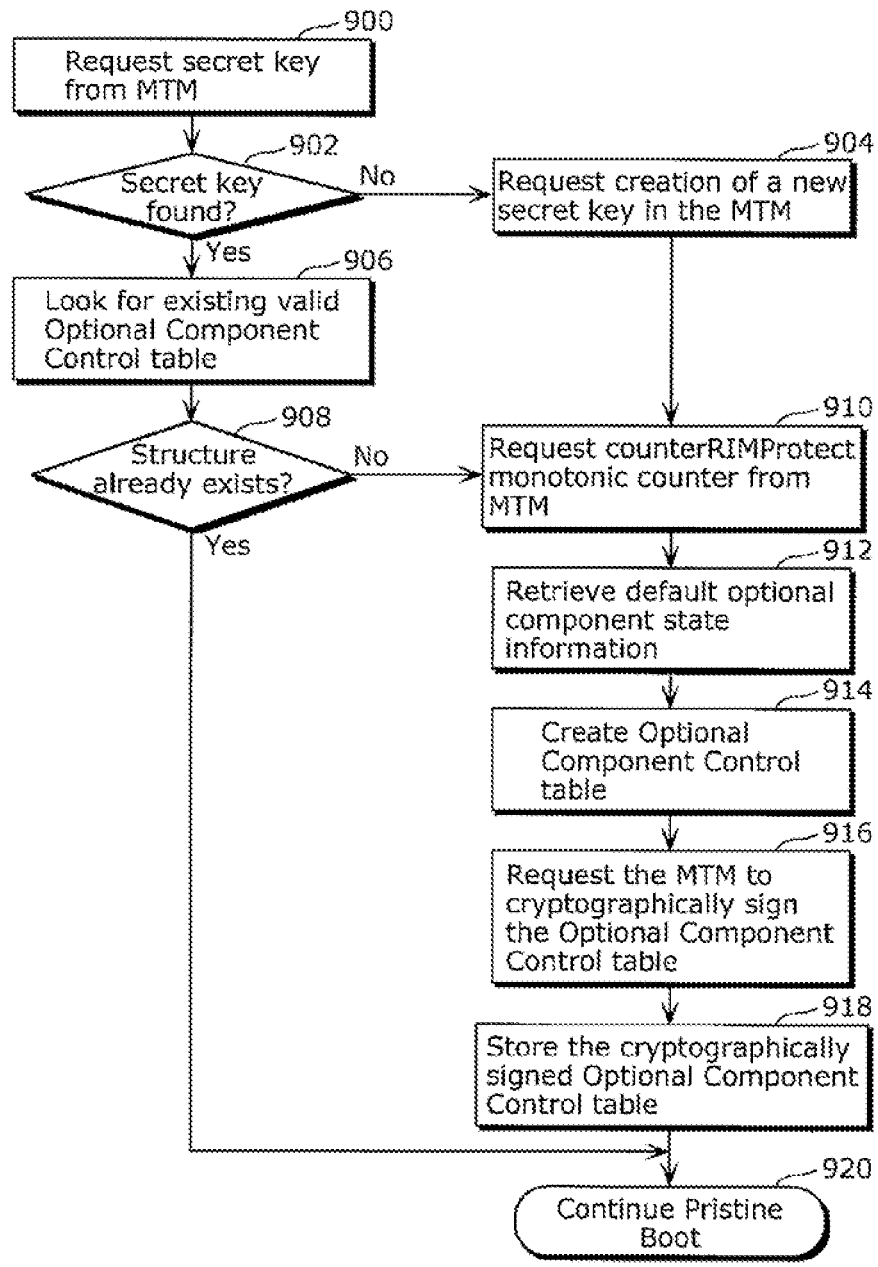

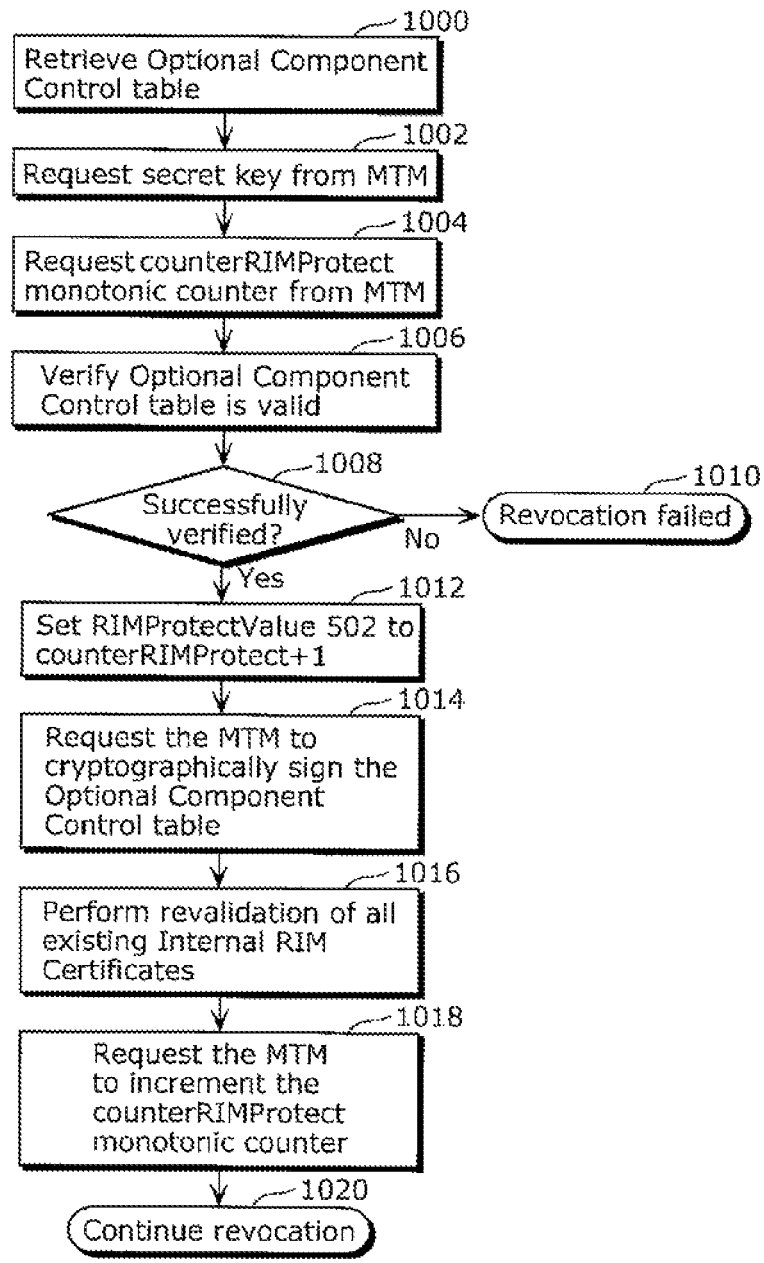
[Fig. 10]

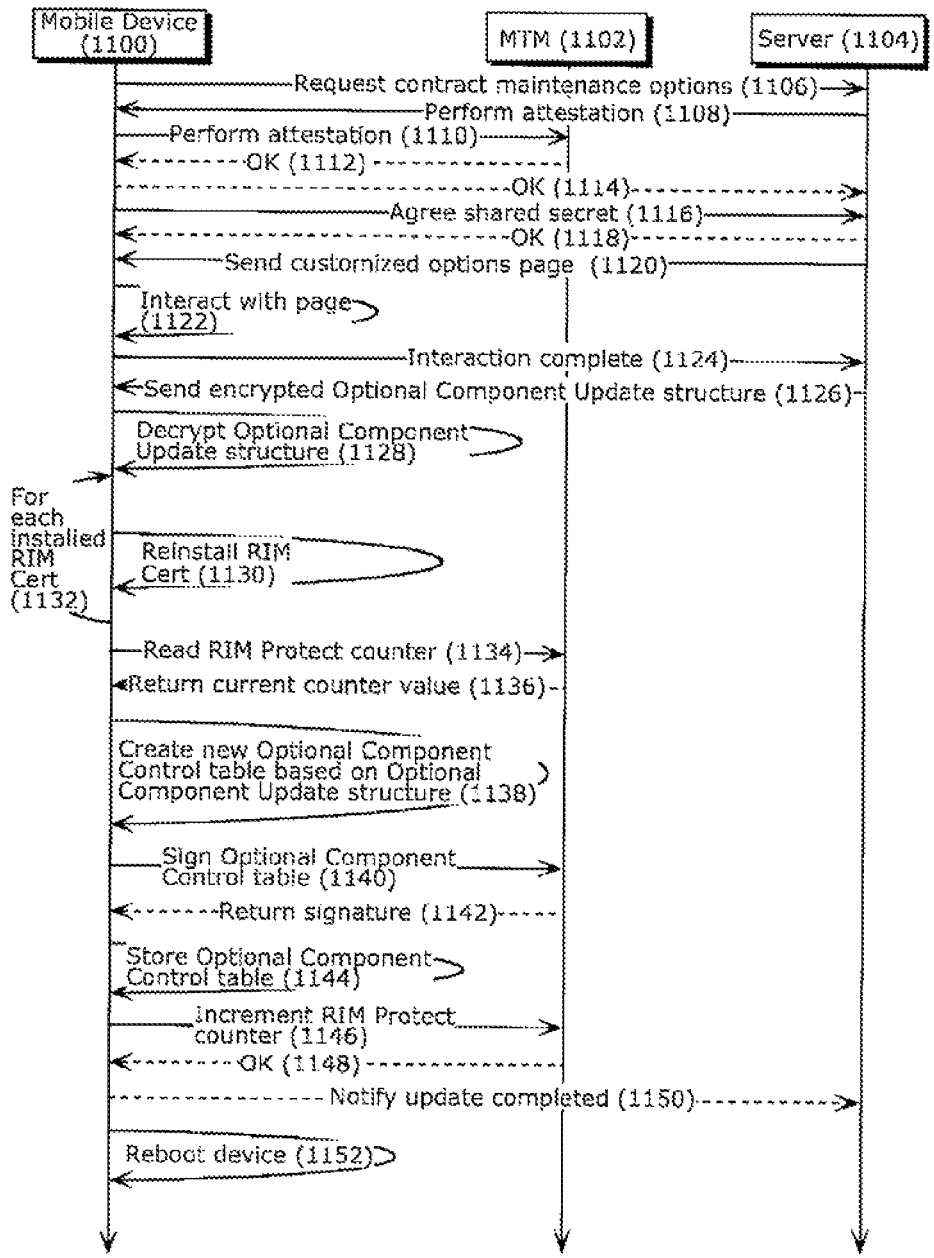
[Fig. 11]

[Fig. 12]
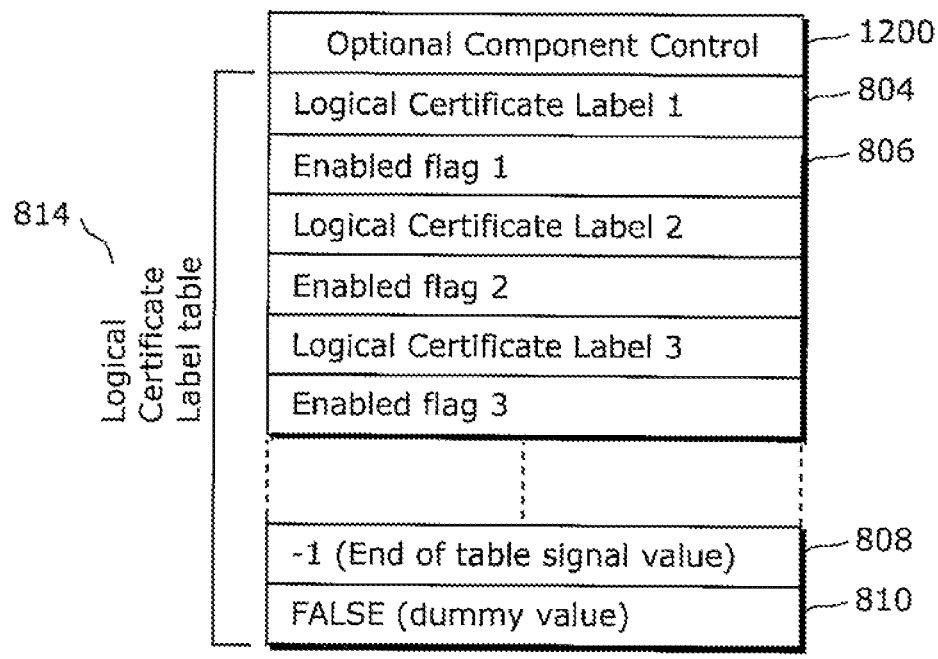

[Fig. 13]
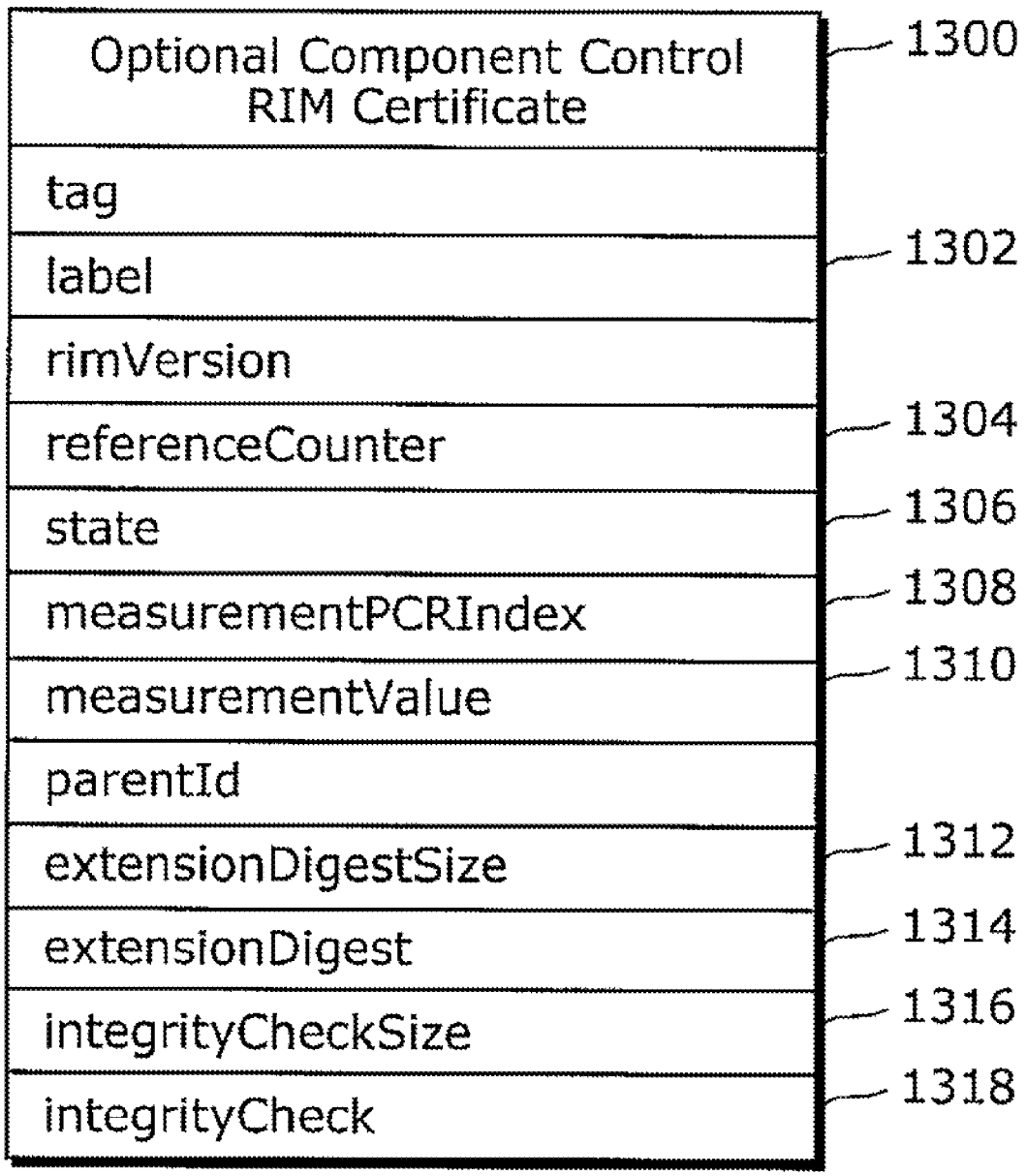

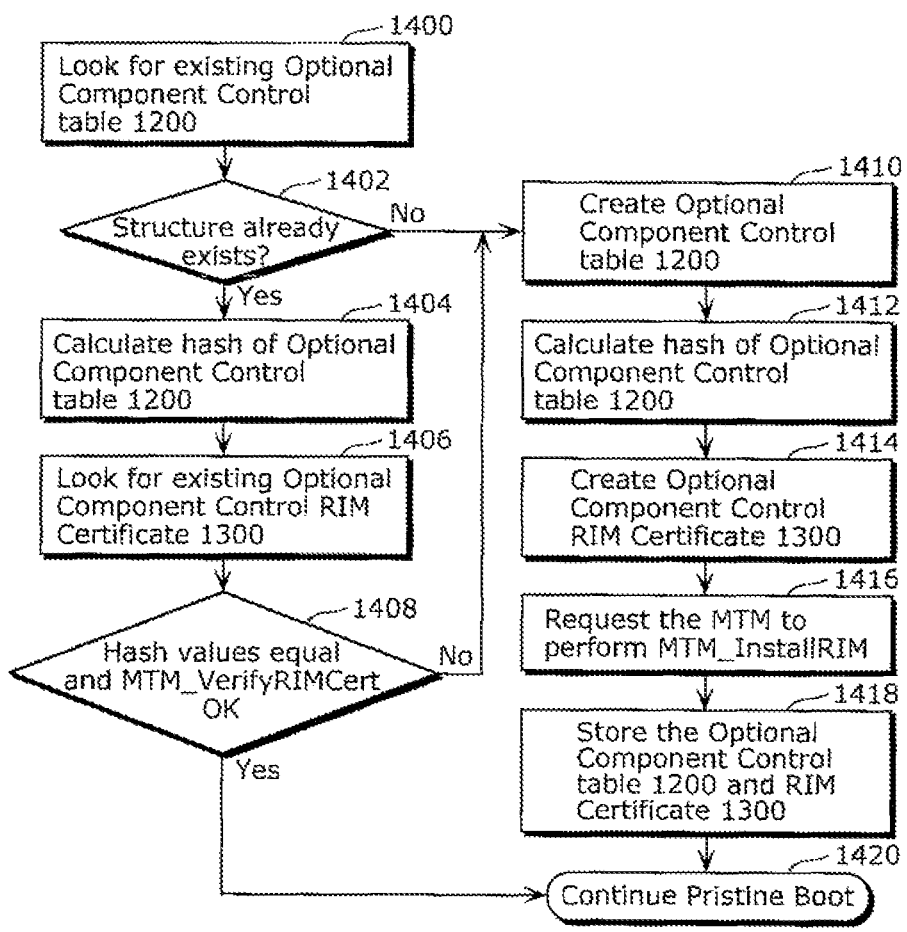
[Fig. 14]

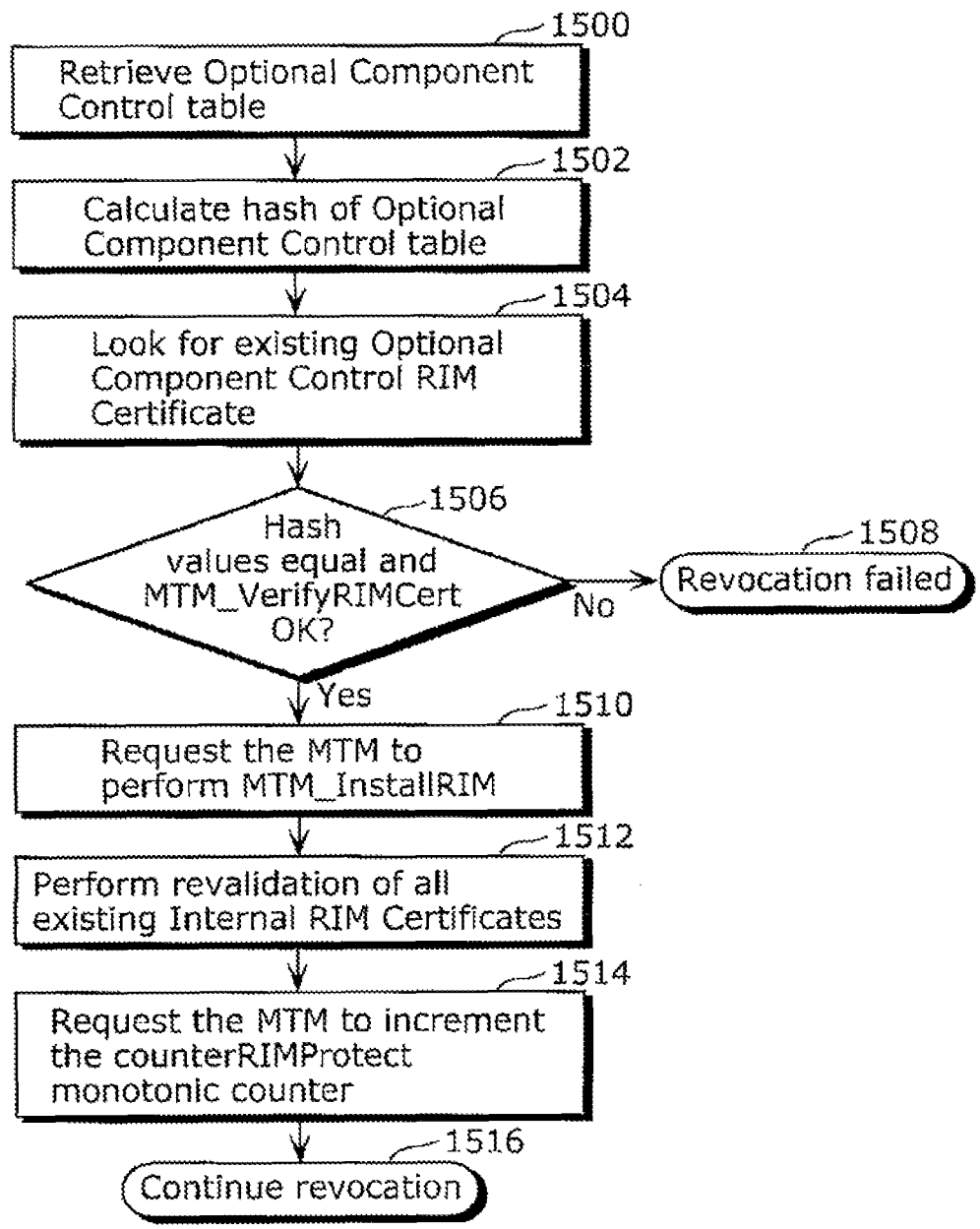
[Fig. 15]

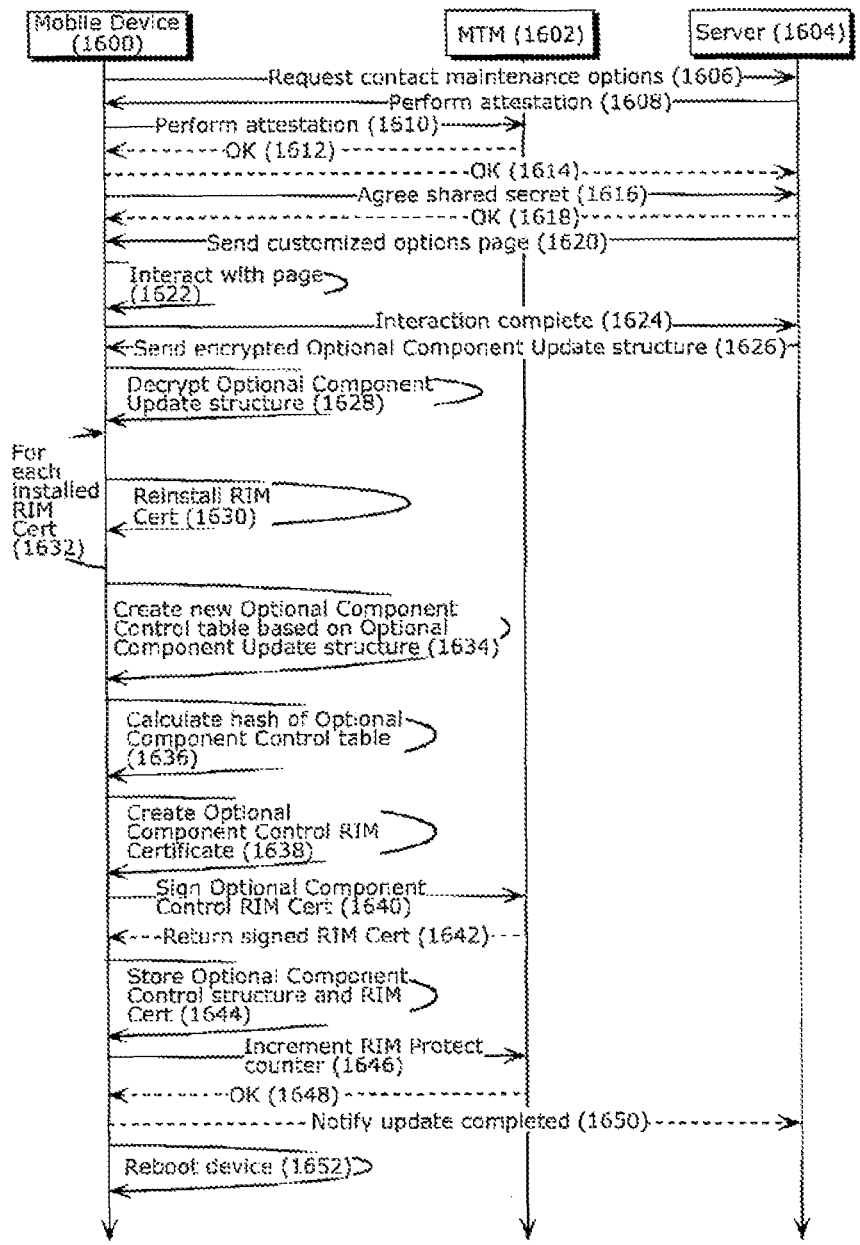
[Fig. 16]

[Fig. 17]
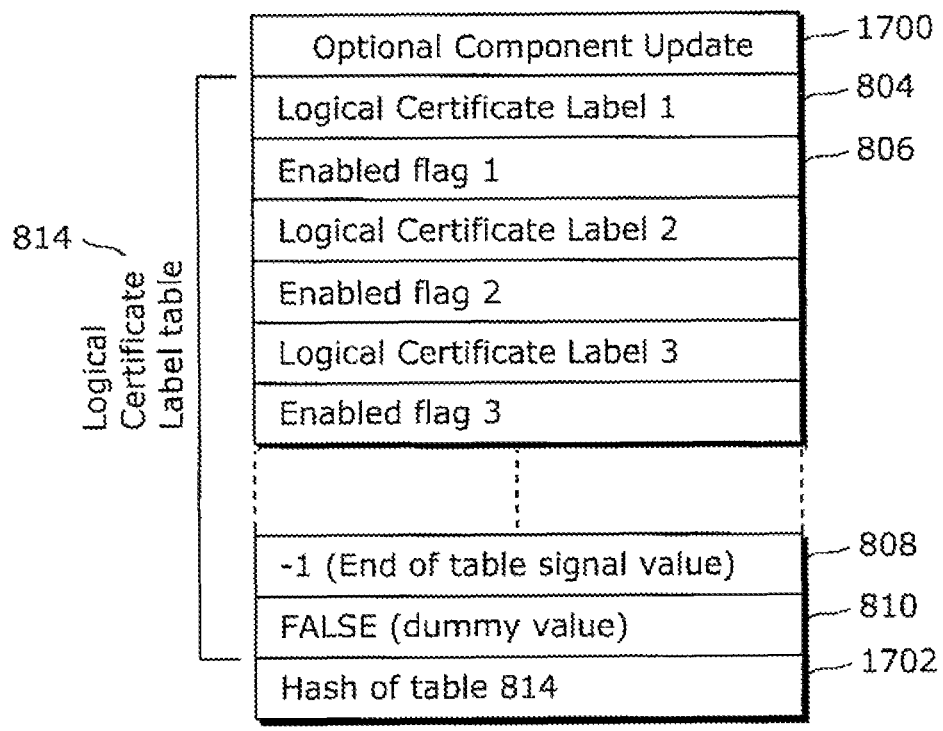

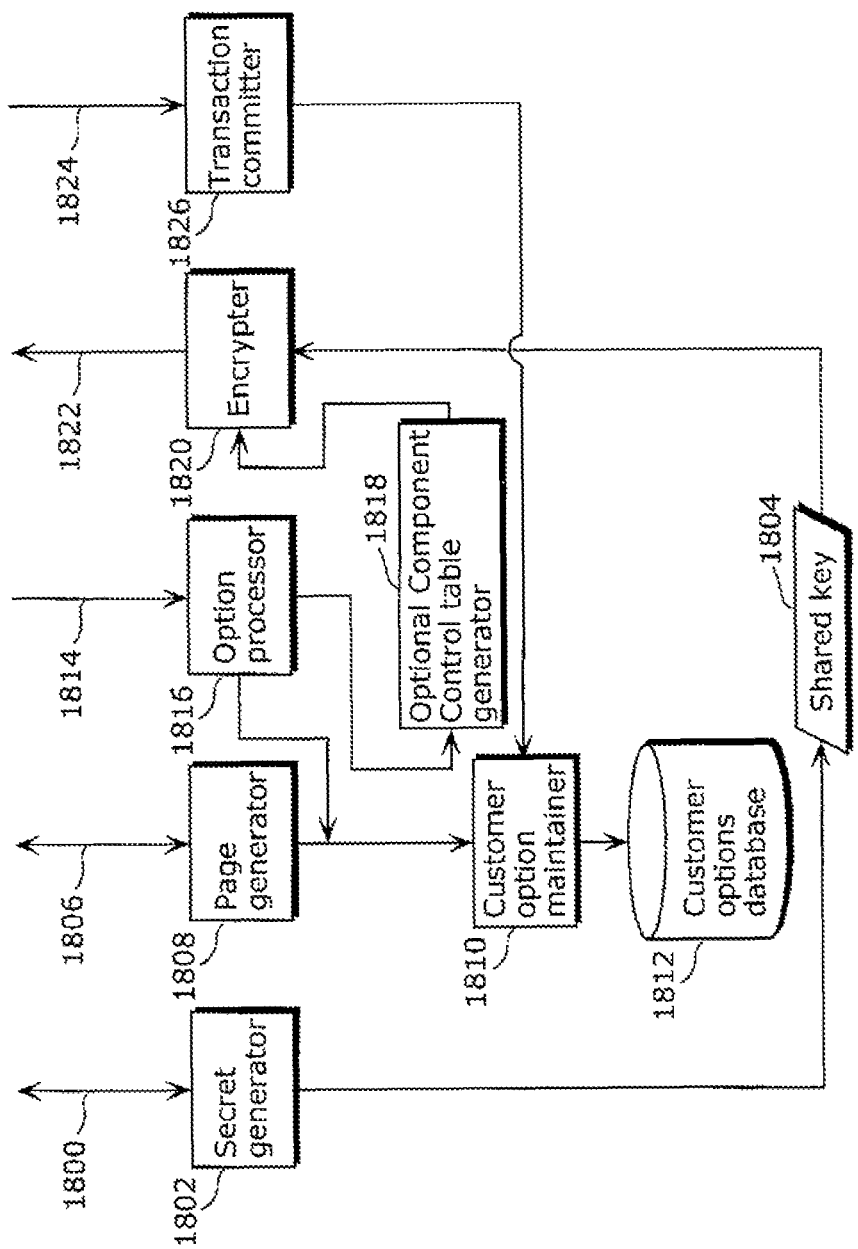
[Fig. 18]

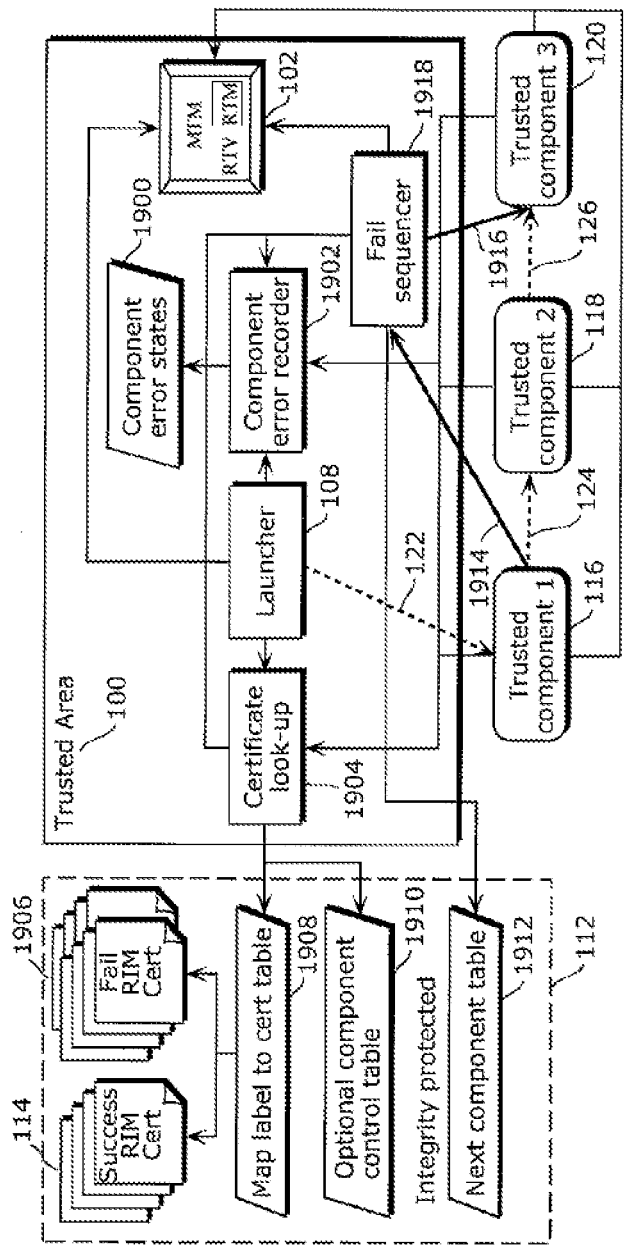
[Fig. 19]

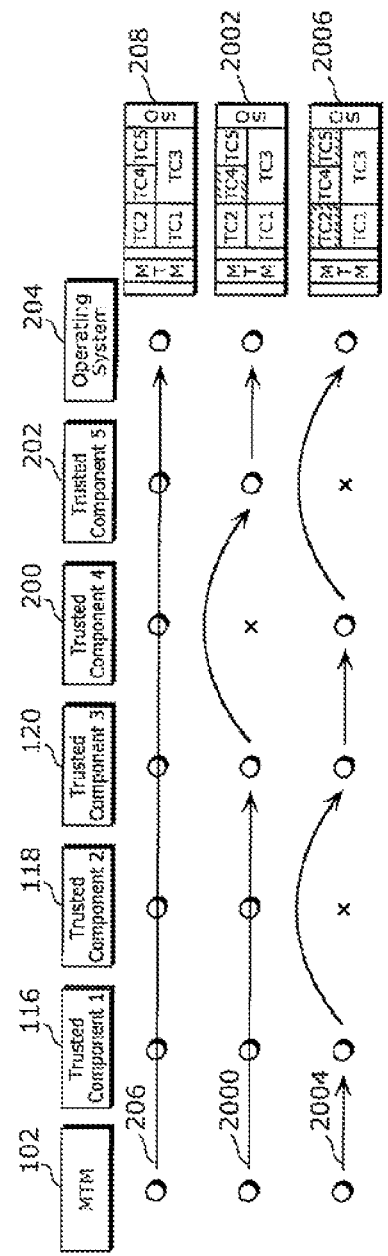
[Fig. 20]

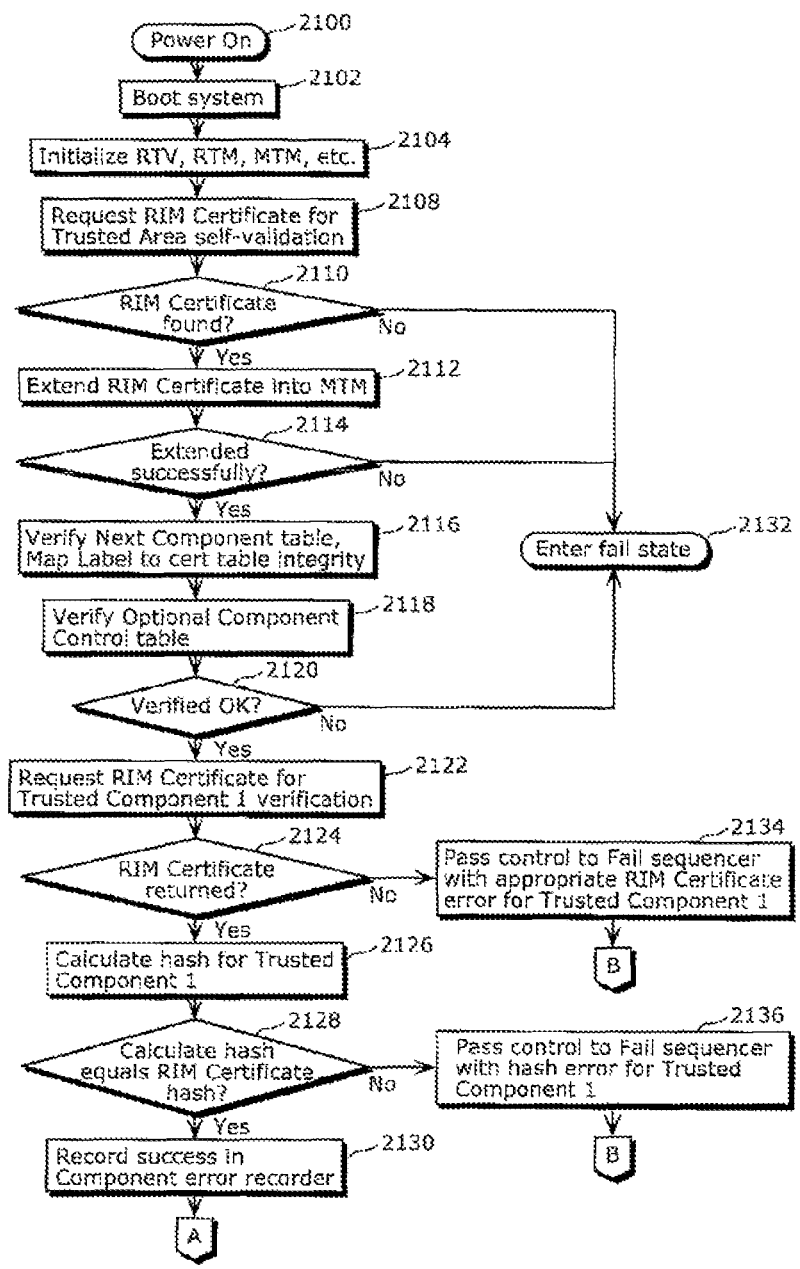

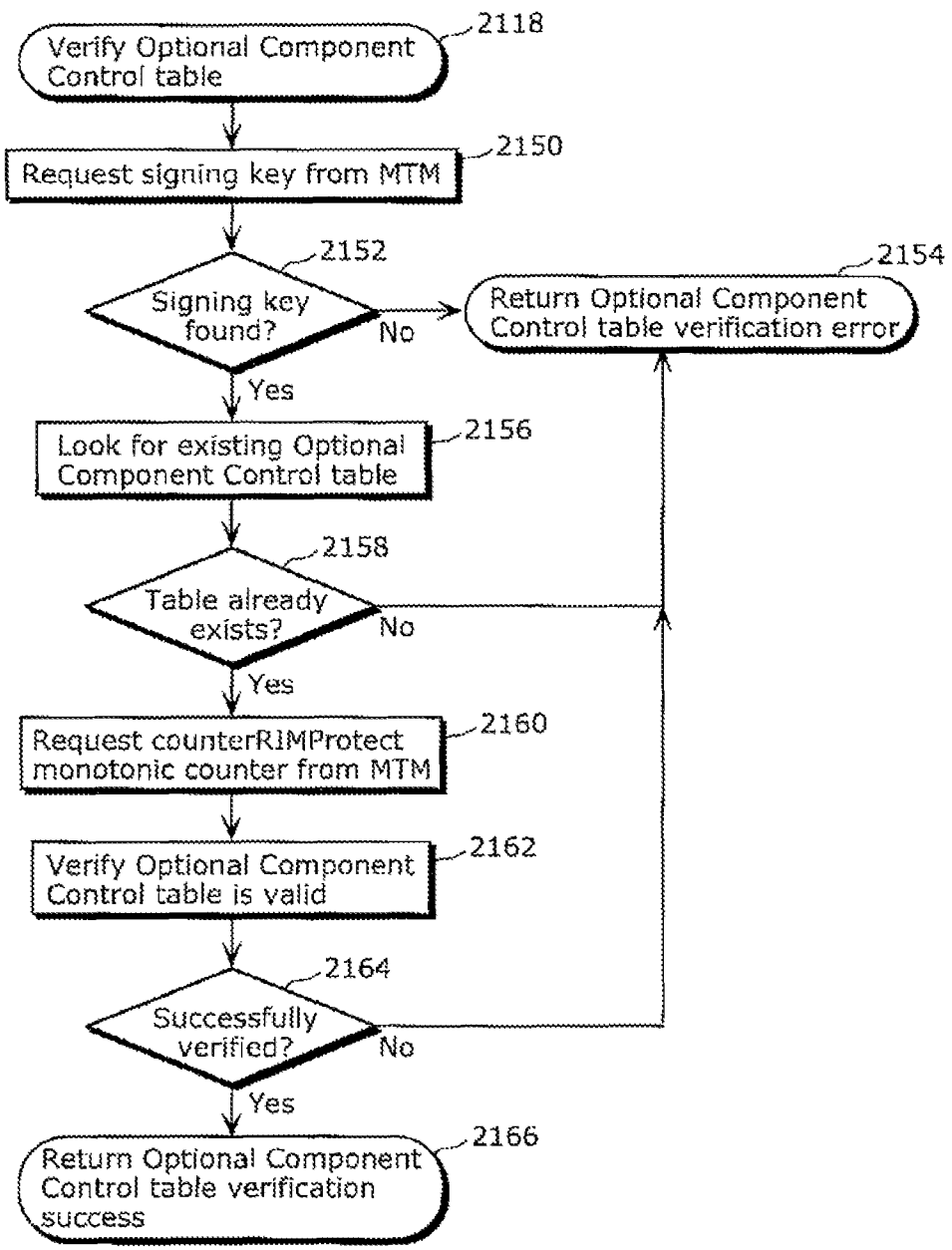

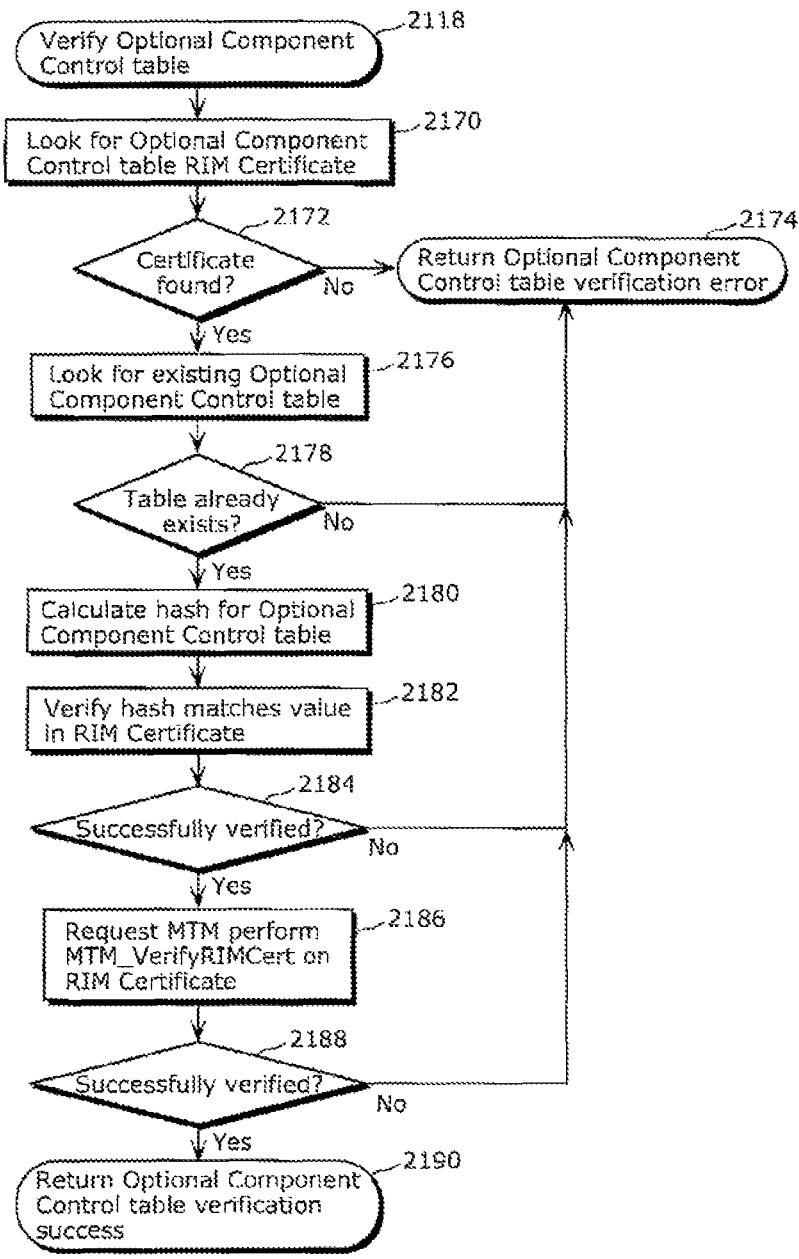

[Fig. 22]
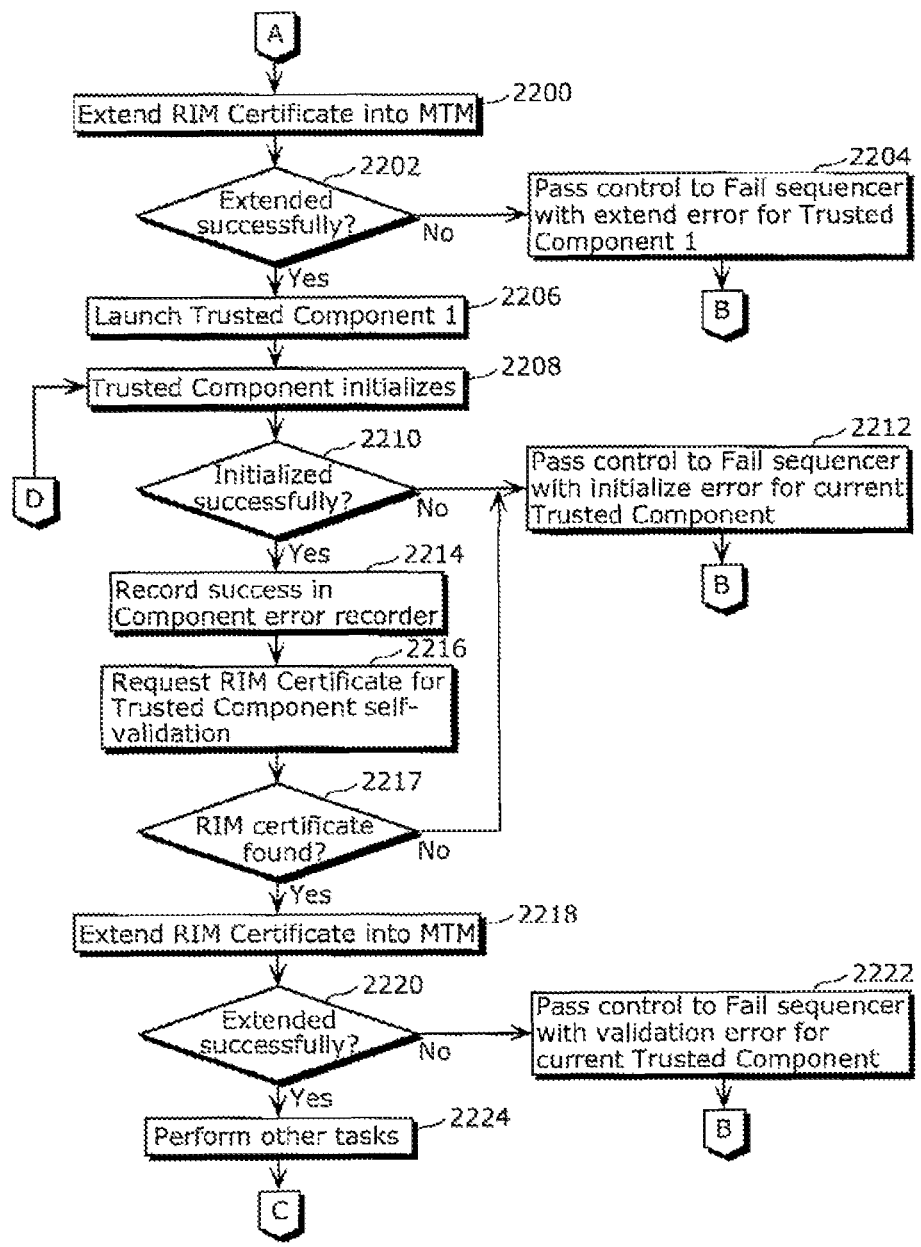

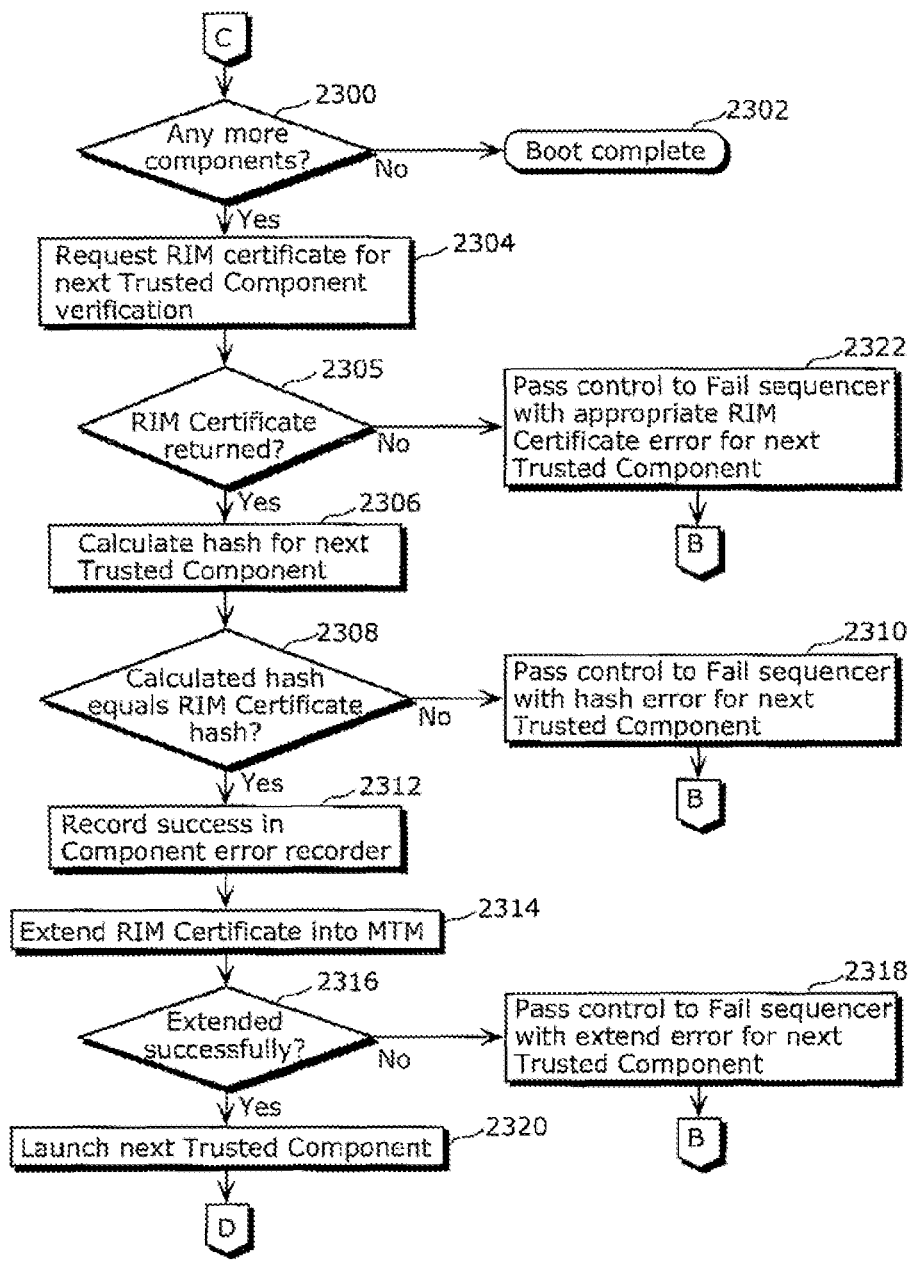
[Fig. 23]

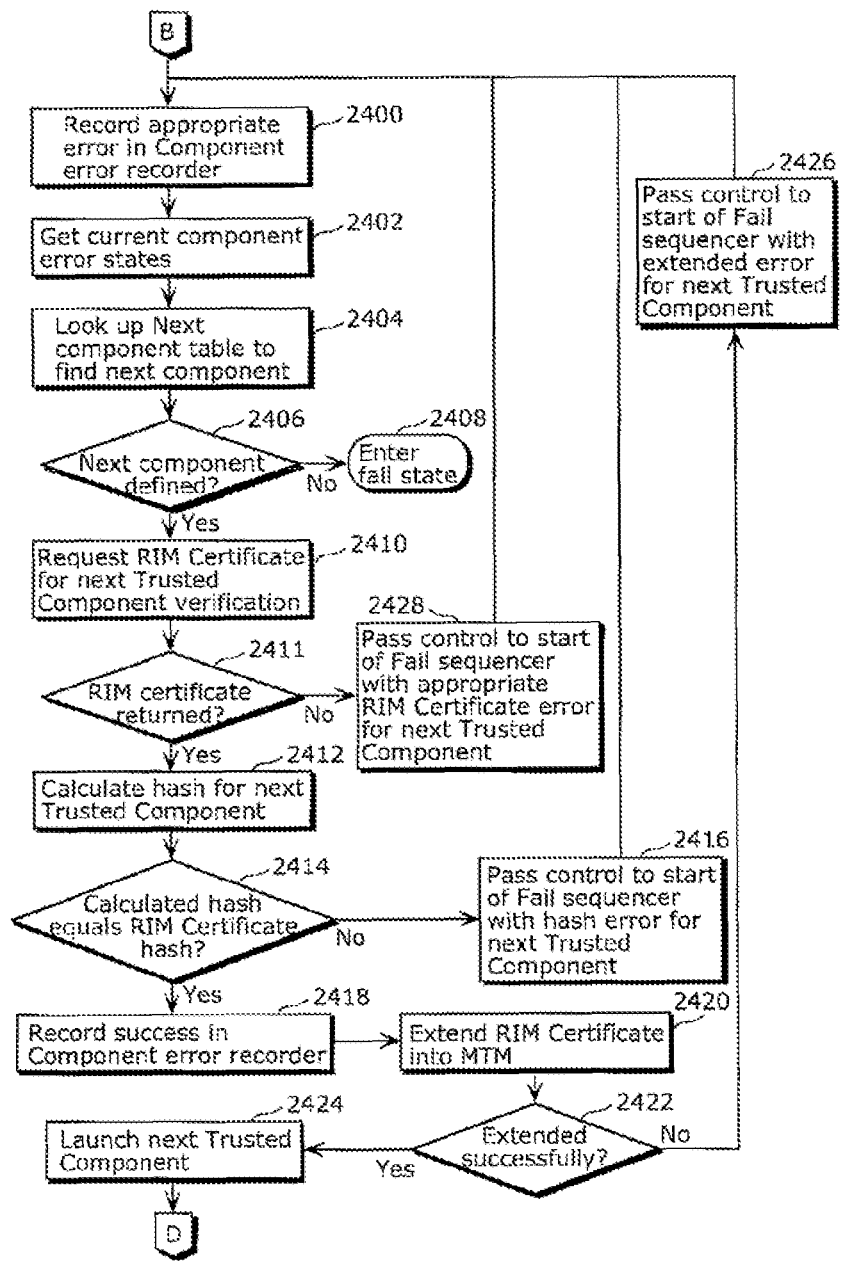
[Fig. 24]

SECURE BOOT METHOD FOR EXECUTING A SOFTWARE COMPONENT INCLUDING UPDATING A CURRENT INTEGRITY MEASUREMENT BASED ON WHETHER THE SOFTWARE COMPONENT IS ENABLED

TECHNICAL FIELD

The present invention relates to secure boot methods and secure boot apparatuses which start up components in assured fashions, and particularly to secure boot methods and secure boot apparatuses which start up optional components.

BACKGROUND ART

Initiatives such as in Non-Patent Literature 1 and Non-Patent Literature 2 describe how to start-up a device in an assured and trusted fashion. These methods have been thoroughly reviewed to ensure that trust and security is maintained throughout the boot process, so provide a useful baseline for those wanting to implement a device that can boot securely. A key component of this secure boot process is a Reference Integrity Metrics (RIM) Certificate. This is a signed structure that defines what the current expected platform state should be, represented by a hash of a set of Platform Configuration Registers (PCRs), which themselves contain known, publically defined hash values. These PCRs act as integrity measurements that may be recorded in RIM Certificates to define an expected machine state. In addition, the RIM Certificate also specifies a PCR to be extended if the current state is verified. This extend process takes a specified PCR and calculates a new hash value based on the previous PCR value concatenated with a new known value defined within the RIM Certificate. A typical secure boot sequence as defined by the Trusted Computing Group (TCG) starts with the initialization and self-verification of the core components such as the Root-of-Trust for Verification (RTV) and the Root-of-Trust for Measurement (RTM) (the RTV+RTM), the Mobile Trusted Module (MTM) itself and associated core MTM interface components. Next, additional components that support other parts of the firmware are started in a trusted fashion, for example, each of them is verified on their starting by another component having been booted before them. And finally the operating system runs to provide a secure and trusted path for client applications to access MTM services.

However, the specifications are rigid, providing only a single control path though the boot process that results either in complete success or complete failure. In other words, if boot process of one component is failed, all of the other components cannot be used even if their own boot processes resulted in success.

Furthermore, the TCG specifications provide facilities for auditing, recognising that portable devices such as mobile phones have limited resources. Although they define these auditing features are optional with an MTM, but this makes problems shown below. As described above, although this feature is merely an option, a failure in the boot process of this feature makes all components of the mobile phone unable to be used. Furthermore, although this feature is not needed to be implemented (because it is an option), the verification becomes always failed without implementing this feature. This makes it harder for other processes to detect why or where there was a failure in the boot process. Furthermore, a device manufacturer may wish to offer certain trusted components as options.

Here, optional components mean, for example, system or application software which can be enabled after the user enters into an additional contract. Here, "enabled (or active)" means changing a state of the application software to a state the user can run the application software. Unless the software is enabled, the use cannot use the system or application software, even if the system or application software itself is pre-installed in the machine or downloaded from a server.

As described above, whether an optional component is enabled or not may be determined by each user's decision. So, the server for sending updated RIM certificates to the machine would to know which components are enabled for each machine in order to send updated certificates corresponding to the enabled components.

Additionally, in many markets there are legal requirements upon service providers to allow users to make emergency calls even from mobile phones that do not have a current service contract or are outside of areas where they have a current service contract. On a phone equipped with an MTM, revocation of certificates or corruption of non-critical components result in a phone that may fail to operate at all, so cannot meet this legal requirement.

In Patent Literature 1, a verified boot method with optional components is disclosed, but the optional components are implemented according to explicit switches; there is no consideration for how to handle an error occurring when handling an optional component such as component program file corruption or hardware initialization failure.

In Patent Literature 2, a verified boot method with components that may fail verification is disclosed, but it does not teach how to solve this problem.

What is needed, therefore, is a method that will support optional components within the context of a secure boot as defined by the TCG Mobile Phone Working Group, and will still operate in a reduced functionality manner even though some RIM Certificates (RIM Certs) are revoked or components are disabled or not functioning, and that will allow an easier, less resource-heavy method of determining the state of a MTM after secure boot finishes.

What is further needed, therefore, is a machine and a server for updating the components that are enabled or disabled without the need for making a customized set of updated certificates available for each machine.

CITATION LIST

Patent Literature

[PTL 1] US Patent application 2005/0138414
[PTL 2] U.S. Pat. No. 6,477,648

Non Patent Literature

[NPL 1] The Trusted Computing Group's (TCG) Mobile Trusted Module (MTM) documents TCG Mobile Reference Architecture version 1.0 12 Jun. 2007
[NPL 2] TCG Mobile Trusted Module Specification version 1.0 12 Jun. 2007

SUMMARY OF INVENTION

Technical Problem

While the background art describe ways to boot according to a single defined sequence, it does not suggest what to do if one non-critical component fails or is not present. Furthermore, a failure state is only recorded for the whole secure boot process, not the individual components. As a result, for each role where a RIM Certificate is needed, there is only a single one available.

Therefore, there is an unmet need for, and it would be highly useful to have, a system and method that allows multiple execution sequences for secure boot to be defined, while still maintaining the security and trust of the device being booted, to enable support on the device for optional and failed components.

Furthermore, there is an unmet need for, and it would be highly useful to have, a system and method that in addition to the above, records the success or failure of each individual component within the secure boot system, to enable the user to determine the state of the secure environment after a secure boot completes.

Furthermore, there is an unmet need for, and it would be highly useful to have, a system and method that in addition to the above, allows the use of multiple RIM Certificates for each role, to enable optional components to be supported while still maintaining the security and trust of the device.

Solution to Problem

A method according to an aspect of the present invention is a method for executing a software component verifiable against integrity measurements, the method including: a) providing a first mapping from logical identifiers to software component enabled status flags; b) providing a second mapping from the logical identifiers and previous software component statuses information to actual integrity measurement certificates containing verification data; c) looking up the first mapping for a given logical identifier identifying the software component to set a status flag indicating whether the software component is enabled (2122); d) looking up the second mapping for a given logical identifier identifying the software component's verification certificate and the previous component statuses to get an integrity measurement certificate (2122); e) calculating check value of the software component to execute (2126); f) verifying the integrity measurement matches integrity measurement value within the integrity measurement certificate and that the calculated check value matches check value within the integrity measurement certificate (2128); g) updating current integrity measurement to include an indication of the check value within the integrity measurement certificate if the status flag indicates that the software component is enabled and the verification is successful (2200); and h) executing the software component if the software component is enabled and the verification is successful (2206).

Furthermore, the method may further include: a) if the component is not enabled, looking up the second mapping for a given logical identifier identifying the component's verification failure certificate and the previous component statuses to get a disabled integrity measurement certificate (2134); b) updating current integrity measurement to include an indication of disabled component status stored within the disabled integrity measurement certificate (2134).

Furthermore, the method may further include: a) if the verification is unsuccessful, looking up the second mapping for a given logical identifier identifying the component's verification failure certificate and the previous component statuses to get a failure integrity measurement certificate (2136); and b) updating current integrity measurement to include an indication of unsuccessful integrity measurement stored within the failure integrity measurement certificate (2136).

Furthermore, the method may further include: a) if the component is not enabled or the verification is unsuccessful, providing a third mapping from logical identifiers and previous software component statuses information to component identifiers (2404); and b) looking up the third mapping for a given logical identifier identifying the component and the previous component statuses to get an alternative software component to be executed (2404).

According to a preferred embodiment of the present invention, the success or failure of each individual component is recorded within a table accessible by all other trusted components.

According to another preferred embodiment of the present invention, multiple execution sequences are described in a table that describes an alternative component to execute after a given component fails. This table is indexed by means of a combination of an identifier for the failed module and the state of the previously executed or failed components.

According to another preferred embodiment of the present invention, optional components are described within a table containing a flag that indicated whether or not the component is enabled. This table is referenced during secure boot to control whether or not optional components are booted or not, thus explicitly describing the preferred execution sequence of the optional components.

According to another preferred embodiment of the present invention, in order that each individual component can be correctly verified according to the state of the previously executed or failed components, each component has multiple RUM Certificates that describe the various valid preconditions that must be true before the component can run.

In order to solve this problem, according to the present invention, a device connectable to a server includes: a storing unit configured to store a plurality pieces of software and a plurality of certificates associated with the plurality pieces of the software, each of the plurality pieces of the software being assigned to one certificate, each of a plurality of certificates being used to verify each of the plurality pieces of the software; a setting unit configured to set to the device one of the plurality pieces of software as enabled one of the plurality of pieces of software, the enabled one of the plurality pieces of software being capable of being executed at the device; an executing unit configured to verify the enabled one of the plurality pieces of software using the certificate associated with the enabled one of the plurality pieces of software, and to execute the enabled and verified one of the plurality pieces of software after the verification; a receiving unit configured to receive from the server, a plurality of updated certificates corresponding to predetermined certificates determined to be updated among the plurality of the certificates by the server, the server determines the certificates to be updated without detecting which one of the plurality of updated certificates is corresponding to the enabled one of the plurality of pieces of software; and a selecting unit configured to select, from the received plurality of the updated certificates, one updated certificate corresponding to the certificate associated with the enabled one of the plurality pieces of software, wherein the executing unit verifies the enabled one of the plurality pieces of software using the one updated and selected certificate.

Advantageous Effects of Invention

By this structure, the device receives updated certificates present on the server without detecting which updated certificates are corresponding to enabled component on the device. So, this aspect of invention can update appropriate certificates for the enabled components without customising a set of certificates to be sent by the server, thus the potentially highly-confidential key required to create the plurality of updated certificates need not be placed upon the server, but instead managed in a secured offline facility.

BRIEF DESCRIPTION OF DRAWINGS

FIG. 1 illustrates a block diagram representing the prior art.

FIG. 2 illustrates the prior art sequencing of a secure boot.

FIG. 3 illustrates the lifetime of a mobile device and the external interactions that involve the Optional Component Control structure.

FIG. 4 illustrates a block diagram representing the key components for maintaining the Optional Component Control table and related data.

FIG. 5 illustrates a RIM Certificate containing additional data representing the table needed to support optional components.

FIG. 6 illustrates the Map label to cert table.

FIG. 7 illustrates the Next component table.

FIG. 8 illustrates an Optional Component Control table containing a counter value, a table of certificate identifiers and their statuses, and a cryptographic signature representing the states of the optional components.

FIG. 9 illustrates a flow chart for the process of initialising the Optional Component Control table according to the present invention.

FIG. 10 illustrates a flow chart for the process of revoking internal RIM Certificates and the interaction needed with the Optional Component Control table according to the present invention.

FIG. 11 illustrates a sequence diagram for the process of interacting with a server to update the Optional Component Control table according to the present invention.

FIG. 12 illustrates an Optional Component Control table containing a table of certificate identifiers and their statuses, representing the states of the optional components.

FIG. 13 illustrates an Optional Component Control table RIM Certificate that protects the table in FIG. 12.

FIG. 14 illustrates a flow chart for the process of initialising the Optional Component Control table during Pristine Boot according to the present invention.

FIG. 15 illustrates a flow chart for the process of revoking internal RIM Certificates using the Optional Component Control table according to the present invention.

FIG. 16 illustrates a sequence diagram for the process of interacting with a server to update the Optional Component Control table according to the present invention.

FIG. 17 illustrates an Optional Component Control Update table that is passed from the server to the mobile device.

FIG. 18 illustrates a block diagram representing the key components within the server for supporting maintenance of the Optional Component Control table by a client device.

FIG. 19 illustrates a block diagram representing secure boot with optional components.

FIG. 20 illustrates the additional sequencing of a secure boot with error detection and optional components.

FIG. 21A illustrates a flow chart for the process of performing a secure boot with optional components according to the present invention.

FIG. 21B illustrates a flow chart for the process of performing a secure boot with optional components according to the present invention.

FIG. 21C illustrates a flow chart for the process of performing a secure boot with optional components according to the present invention.

FIG. 22 illustrates a flow chart for the process of performing a secure boot with optional components according to the present invention.

FIG. 23 illustrates a flow chart for the process of performing a secure boot with optional components according to the present invention.

FIG. 24 illustrates a flow chart for the process of performing a secure boot with optional components according to the present invention.

DESCRIPTION OF EMBODIMENTS

According to a 1st aspect of the present invention, a device connectable to a server includes: a storing unit configured to store a plurality pieces of software and a plurality of certificates associated with the plurality pieces of the software, each of the plurality pieces of the software being assigned to one certificate, each of a plurality of certificates being used to verify each of the plurality pieces of the software: a setting unit configured to set to the device one of the plurality pieces of software as enabled one of the plurality of pieces of software, the enabled one of the plurality pieces of software being capable of being executed at the device; an executing unit configured to verify the enabled one of the plurality pieces of software using the certificate associated with the enabled one of the plurality pieces of software, and to execute the enabled and verified one of the plurality pieces of software after the verification; a receiving unit configured to receive from the server, a plurality of updated certificates corresponding to predetermined certificates determined to be updated among the plurality of the certificates by the server, the server determines the certificates to be updated without detecting which one of the plurality of updated certificates is corresponding to the enabled one of the plurality of pieces of software; and a selecting unit configured to select, from the received plurality of the updated certificates, one updated certificate corresponding to the certificate associated with the enabled one of the plurality pieces of software, wherein the executing unit verifies the enabled one of the plurality pieces of software using the one updated and selected certificate.

According to a 2nd aspect of the present invention, the server transmits commonly the plurality of the updated certificates to the device and another device.

According to a 3rd aspect of the present invention, the plurality of the updated certificates includes an updated certificate corresponding to a certificate associated with another one of the plurality pieces of software than the enabled one of the plurality pieces of software.

According to a 4th aspect of the present invention, the device further includes: an updating unit configured to update the certificate associated with the enabled one of the plurality pieces of software, based on the one updated certificate, wherein the executing unit verifies the enabled one of the plurality pieces of software using the certificate updated by the updating unit.

According to a 5th aspect of the present invention, the device further includes: an device key storing unit configured to store a device key, the device key is a unique key of the device; the updating unit updates the certificate associated with the enabled one of the plurality pieces of software, by converting the one updated certificate using the device key, and overwriting the certificate associated with the enabled one of the plurality pieces of software with the converted one updated certificate.

According to a 6th aspect of the present invention, the device further includes: an flag storing unit configured to store an enabling flag indicating the enabled one of the plurality pieces of software, when the setting unit sets to the device the one of the plurality pieces of software as the enabled one of the plurality of pieces of software, wherein the selecting unit configured to select, from the received plurality of the updated certificates, one updated certificate corresponding to the certificate associated with the enabled one of the plurality pieces of software, based on the enabling flag stored in the flag storing unit.

According to a 7th aspect of the present invention, the device further includes: a counter configured to increment a counter value when the revoking unit revokes the one certificate stored in the storing unit; a counter value setting unit configured to set the incremented counter value to management information including the enabling flag when the counter value is incremented; and a determining unit configured to determine whether the management information is tampered with, using the counter value set in the management information.

According to a 8th aspect of the present invention, the device further includes: a calculation unit configured to calculate a cryptographic hash value of the management information including the enabling flag and the counter value; a value storing unit configured to store a verification value corresponding to the calculated cryptographic hash value; a verifying unit configured to verify whether or not the management information is tampered with by comparing the stored verification value and the calculated cryptographic hash value, before the selecting unit uses the management information for selecting the one updated certificate.

According to a 9th aspect of the present invention, the device of further includes: a mapping data storing unit configured to store a mapping data showing mapping between the plurality pieces of software and the plurality of certificates; a calculation unit configured to calculate a cryptographic hash value of the mapping data; a value storing unit configured to store a verification value corresponding to the calculated cryptographic hash value; a verifying unit configured to verify whether or not the mapping data is tampered with by comparing the stored verification value and the calculated cryptographic hash value, before the selecting unit selects the one updated certificate; and the selecting unit selects the one updated certificate based on the mapping data.

According to a 10th aspect of the present invention, the device further includes: a counter configured to increment a counter value when the revoking unit revokes the one certificate stored in the storing unit; a counter value assigning unit configured to assign the incremented counter value to the mapping data when the counter value is incremented; and the calculation unit calculates the cryptographic hash value using the mapping data and the counter value assigned to the mapping data.

(Overview of the Present Embodiment)

The present embodiment relates to a system for updating a certificate used for verifying a piece of software. In a device, if there are one or more optional components, it is depending on a user's decision which component is being enabled. So, usually a server needs to know which components are enabled for each device in order to send updated certificates corresponding to enabled components. Also, the server sends a customized set of updated certificates, corresponding to enabled components of each device, for the each device.

However, it is very cumbersome and takes much cost to make a customized set for each device. So, in the present embodiment, a system for updating certificates without making a customized set for each device is shown.

The present invention relates to a system for supporting optional or failing components within a system that will perform a secure boot. By providing the described additional RIM Certificates and data tables a developer of a device that supports secure boot is able to produce a system that has flexibility to deal with components that fail to start or have been indicated to be disabled, and a device that is able to report the state of the components within the trusted environment that results from the secure boot. By further providing a list of enabled optional components, the system will also deal with components that may be enabled and disabled by external actors. The present embodiment is supposing a system in which at least one component in the device is optional, and the certificate is used to verify the component and other component(s) booted before the component at the timing of booting the component. So, in a usual system, a fail in the boot process of a component, or a component being disabled so it is not booted, affects the boot processes of other components which boot after the failed component, even if the failed component is optional and other components themselves are valid. To avoid this problem, the present embodiment uses Fail RIM Cert and Success RIM Cert described below.

This structure is also new from the prior art. However, please note that the part of present invention relating to revoking certificates can be applied to a system which does not deal with the problem shown above.

A new system and method for revoking components including dealing with optional components on a device that supports secure boot is described. In the following description, for purposes of explanation numerous specific details are set forth in order to provide a thorough understanding of the present invention. In other instances, well-known structures and devices are shown in block diagram form without explaining their specific details to facilitate explanation. It will be evident, however, to one of ordinary skill in the art that the present invention may be practiced by modifying or without these specific details. The description of preferred embodiments is not intended to limit the scope of the claims appended hereto.

(Detail of the Present Embodiments)

The present invention relates to a system for supporting optional or failing components within a system that will perform a secure boot. By providing the described additional RIM Certificates and data tables, a developer of a device that supports secure boot is able to produce a system that has flexibility to deal with components that fail to start, and a device that is able to report the state of the components within the trusted environment that results from the secure boot.

FIG. 1 illustrates the prior art. This figure captures the state of the secure boot process at a moment in time after the core elements such as the RTV+RTM and the MTM interface within Trusted Area 100 have self-verified. The MTM 102 is the core of this Trusted Area 100, but other key items within this are the System state 104 flag that indicates whether or not the secure boot has progressed correctly; the System error recorder 106 that sets the System state 104; the Launcher 108 that is responsible for launching the next component that is to be added to the Trusted Area 100; and the Certificate database 110 that looks up the required Success RIM Cert 114. These Success RIM Certs 114 describe the expected platform states during a fully successful secure boot. RIM Certs should be protected from altering in order to check whether the secure boot results in success or not correctly, so, they are integrity protected, and are placed in the set of Integrity protected 112 data items. As defined by the TCG, this integrity protection is achieved by having a signed hash embedded within the RIM Cert, thus allowing the MTM 102 to detect tampering.

The purpose of the secure boot is to expand the Trusted Area 100 to encompass additional components such as Trusted component 1 116, Trusted component 2 118, and Trusted component 3 120. The dotted line from Launcher 108 through Trusted component 1 116, Trusted component 2 118, and Trusted component 3 120 labelled 122, 124 and 126 indicates the normal execution path according to one aspect of the prior art. According to another aspect of the prior art, further trusted components may be present, with the operating system (not shown) as the final trusted component. A particular sequence for launching trusted components is defined by the design of the particular secure boot system.

FIG. 2 illustrates the outcomes of the prior art secure boot process according to the method described in FIG. 1. Here, the standard boot sequence starts from the MTM 102, then Trusted component 1 116 runs, passes control to Trusted component 2 118, and so on through Trusted component 3 120, Trusted component 4 200, Trusted component 5 202 then finally the Operating System 204. Trusted component 2 118, Trusted component 4 200 and Trusted component 5 202 are components that provide further optional services on top of basic services provided by Trusted component 1 116 and Trusted component 3 120. In a successful case, as noted in the flow 206, all components run successfully and a fully-operating trusted area 208 is available. However, in flow 210 Trusted component 4 200 fails to load, so the whole of the trusted area 212 is unavailable due to being in a failed state. In the trusted area diagrams 208 and 212, MTM represents the MTM 102, TC1 represents Trusted component 1 116, TC2 represents Trusted component 2 118, TC3 represents Trusted component 3 120, TC4 represents Trusted component 4 200, TC5 represents Trusted component 5 202, and OS represents Operating System 204. All components depend on the MTM 102, and in addition Trusted component 2 118 depends on Trusted component 1 116, and Trusted component 4 200 and Trusted component 5 202 depend on Trusted component 3 120. The Operating System 204 depends on Trusted component 1 116 and Trusted component 3 120. Shaded parts shows the components which can not used.

FIG. 3 illustrates the lifecycle of a mobile device featuring secure boot. At the factory 300 an initialisation process 302 installs a set of optional components along with information about which optional components are available for each device. When it gets shipped to a mobile phone store 304 or other vendor such as an online store, etc., the customer may purchase or contract into various options 306 corresponding to optional components. The mobile device 308 is now ready to be used, and during the lifetime of the device activities such as updated certificates 310 for optional and mandatory components being broadcast to all devices 312 will occur as defined by the TCG Mobile Reference Architecture. In addition, the device owner may explicitly update their contract options 314 through a server provided by the mobile phone carder 316 or other device management entity, causing the set of optional components available to a particular device to be updated. The behaviour of each of these processes involved in managing the optional components will be described below.

FIG. 4 illustrates an aspect of the current invention, namely the method for creating and maintaining the optional components within the system. The key functional elements and data items are as follows. First, the data structures are all integrity protected 400; in the preferred embodiment this is achieved by the use of signed hashes. The data structures are first the Success RIM. Certs 402 and Fail RIM Certs 404, the certificates that describe the expected platform states during a secure boot where all components are operating correctly and one or more components have failed to operate correctly or have been failed to start due to being disabled respectively. The Map label to cert table 406 maps the statuses of the trusted components to specific Success RIM Certs 402 or Fail RIM Certs 404, the Optional Component Control table 408 describes which optional trusted components are enabled or disabled, and the default Optional Component Control table 410 that serves to initialise the Optional Component Control table 408 at first boot of the mobile phone, or at other times should the Optional Component Control table 408 become corrupted. In a preferred embodiment, the structure of this table is identical to that of the Optional Component Control table 408. To initialise this Optional Component Control table 408 the Initialiser 426 creates an Optional Component Control table 408 based upon the default Optional Component Control table 410. The details of this process are described later.

The Certificate updater 412 keeps the Success RIM Certs 402 and Fail RIM Certs 404 up to date, by processing a list of certificates delivered from a mobile phone broadcast tower over the wireless network 416, and received at the device by the Update receiver 414. The details of this process are described later. One ordinarily skilled in the art will see that there are other ways to make these updates available, such as through a memory card, or via other wired or wireless transmission means.

The Contract updater 418 maintains the enabled or disabled statuses of components within the Optional Component Control table 408 by requesting the Web browser on the device 420 to access an optional component maintenance page located on the Server 424. In a preferred embodiment, the Web browser 420 to Server 424 connection 422 uses Secure Socket Layer (SSL) to protect the communication channel from attack. The details of this process are described later.

FIG. 5 illustrates a RIM Certificate 500, a detail of Success RIM Cert 402 and Fail RIM Cert 404, based on the RIM Certificate as defined by the TCG Mobile Trusted Module Specification. To enable support for optional components, the mapIDtoCertTableSize 506, mapIDtoCertTable 508, nextComponentTableSize 510 and neXtComponentTable 512 are appended to the certificate, and the extensionDigest 504 entry contains a cryptographic hash value for this extra data. Only one instance of this extended RIM certificate is required, and the one embodiment attaches these tables to the single RIM Certificate that the RTV+RTM uses to self-verify. This aspect of the prior art is not described here, however.

In addition, the RIM Certificate 500 has a label field 502 that identifies the RIM Certificate.

One ordinarily skilled in the art will see that there are other ways to make available and to maintain the integrity of mapIDtoCertTable 508 and nextComponentTable 512 without using a RIM Certificate 500, such as cryptographically signing each table individually or together by using a secret key known to both the signee and to the Trusted Area 100.

FIG. 6 illustrates the format of the Map ID to Cert table 508 with data entries that illustrate a mapping from logical certificate labels that act as identifiers for components, and previous software components statuses to actual RIM Certificates. The Map ID to Cert table 508 is an example of a second mapping from logical identifiers and previous software components statuses information to actual integrity measurement certificates containing verification data. The first column, Logical certificate label 600 is an identifying label that is an example of the logical identifiers and signifies a particular role for a particular Success RIM Cert and zero or more Fail RIM Certs and is the label that other parts of the system use to request a RIM Certificate. The second column, Dependent trusted component status 602 is a set of flags indicating for what set of trusted component error states each row is valid.

The third column, Dependent trusted component mask 604 is a set of flags indicating which components are to have their statuses checked. In one embodiment, these two columns are implemented using bitmaps. Finally, the RIM Certificate label 606 column holds the actual RIM Certificate label that is to he used to look up the Success RIM Cert 402 or Fail RIM Cert 404 from the RIM Certificate database. The RIM Certificate label 606 is an example of the actual integrity measurement certificates containing verification data. This value represents an instance of the RIM Certificate label field 502 as defined by the TCG.

FIG. 7 illustrates the format of the Next component table 512 with sample data entries. The Next component table 512 is an example of a third mapping from logical identifiers and previous software component statuses information to component identifiers. The first column, Failed trusted component 700 is an identifier that is an example of the logical identifiers and signifies a component that has failed. The second column, Dependent trusted component status 702 is a set of flags that is an example of the previous software component statuses information and indicates for what set of Trusted component error states the current row is valid. The third column, Dependent trusted component mask 704 is a set of flags indicating which components are to have their statuses checked. In one embodiment, these two columns are implemented using bitmaps. Finally, the Trusted component to launch 706 column holds identifiers that are examples of the component identifiers and describe for a given Failed trusted component 700 and a set of Dependent trusted component statuses 702 which module should be launched next or whether the boot should be aborted because the secure boot has got into an unrecoverable state. Referring to FIG. 4, if the components Trusted Component 1 116 or Trusted Component 3 120 failed to load, there may be an entry indicating the next Trusted component to launch 706 is actually an instruction to Abort Boot; this is because these two components are base components essential to the operation of the complete trusted system. If Trusted Component 2 118, Trusted Component 4 200 or Trusted Component 5 202 failed, there may be entries indicating, for example, that Trusted Component 3 120, Trusted Component 5 202 and Operating System 204 respectively is the next Trusted component to launch 706.

The contents of tables Map ID to Cert table 508 and Next component table 512 are defined by the design of the Secure Boot sequence required for a particular device. In the embodiment described above where the tables are attached to the RIM Certificate that the RTV+RTM uses to self-verify, the RIM Certificate issuing authority as defined by the TCG (most likely the device manufacturer) will generate these tables and add the data to the particular RIM Certificate, then sign the certificate and make it available for use on the device. However, these tables may be generated by another party and sent separately from the RIM Certificate. Furthermore, if the secure boot system can analyze its own Secure Boot sequence, the secure boot system may generate these tables by itself.

These tables are generated according to information showing which component is dependent on another component. If component A is dependent on another component B, the component A should not be booted if the boot procedure of component B fails. And if the component A is independent from the component B, the boot process can be resumed from the boot procedure of component A even if the component B could not boot successfully. Of course, these tables can be generated according to more information. For example, they can be generated according to information showing some components should not be booted if the boot procedure of another independent was failed. This information can be generated and provided by the author of each trusted component.

In order to manage these Trusted Components that may be optionally enabled by an external actor such as the mobile device owner or the mobile device service provider or the mobile device manufacturer, the device will maintain a list of which optional trusted component are enabled or disabled. FIG. 8 illustrates a preferred embodiment of this data, in the Optional Component Control table 408. The Optional Component Control table 408 is an example of a first mapping from the logical identifiers to software component enabled status flags. The RIMProtectValue 802 is a copy of the counterRIMProtect monotonic counter as defined by the TCG Mobile Trusted Module Specification at the time of creation or update of the structure, to help protect the structure against rollback or reflash attacks. Next is a table with two fields in each row; first an optional trusted component Logical certificate label 804, with uses the same component identifiers as used for the Logical certificate ID 600 in the mapIDtoCertTable 508. The Logical certificate label 804 is an example of the logical identifiers. Next, a flag 806 to indicate whether or not the optional trusted component identified by the Logical certificate ID 804 is enabled, in which case the flag is set to TRUE; or disabled, in which case the flag is set to FALSE. The flag 806 is an example of the software component enabled status flags. This pair of values is repeated for each optional trusted component in the system, and the table is terminated by a Logical certificate ID of −1 808 and a flag conventionally set to FALSE 810, for disabled. Collectively, this set of pairs of values is known as the Logical certificate label table 814. Finally, to protect all the above data within the Optional Component Control structure from tampering, there is a cryptographic signature 812 produced according to the PKCS #1 v1.5 specification signed with a secret key created as described in FIG. 9 below and unavailable to external processes. One ordinarily skilled in the art will see that there are other ways to make available and to maintain the integrity of the status of each of the optional components, and other digital signature algorithms such as HMAC may be used.

FIG. 9 illustrates the initial creation of the Optional Component Control table according to the present invention. The process illustrated will occur on the very first boot of the device, once the MTM has initially started up, as detailed in the TCG Mobile Trusted Module Specification for Pristine Boot. As also detailed within that document. Pristine Boot can occur at other times in the mobile device's lifecycle, so FIG. 9 also illustrates the recreation of the structure as required. First, after the Pristine Boot sequence has performed sufficient initialisation to build and initialise the MTM and the roots of trust, the secret key for signing the Optional Component Control structure is requested from the MTM 900. In the preferred embodiment, the secret key indicates the private key of an RSA key pair. The success or failure of this request is checked 902, and if the MTM failed to find the requested key, a secret key gets created within the MTM 904. This key must be created with the usage type TPM_KEY_SIGNING as defined within the TPM Main Specification Part 2, and in a preferred embodiment the key algorithm is TPM_ALG_RSA of length 1024 bits, and usable with the TPM_SS_RSASSAPKCSA1v15_SHA1 signature scheme. If the secret key is found, however, there is no need to create it, so instead there is a check to see if there is an existing and validly signed Optional Component Control table 906. If there is one, there is no need to recreate it, as recreation of the structure may overwrite changed options, for instance, and the Pristine Boot procedure continues 920 with other processing as specified within the TCG Mobile Reference Architecture. If there is no Optional Component Control table (or if there was no secret key found so it had to be created 904), then the monotonic counter managed by the MTM for protecting RIM Certificates is requested 910, as is default state information for the optional components 912. A new Optional Component Control table is created 914, and the monotonic counter is inserted into the RIMProtectValue field 802, and the optional components and their status into the fields 804 and 806, and the table terminator 808 and 810 are also created. Next, this new structure is passed to the MTM with a request to cryptographically sign it with the key created or retrieved earlier 916. This signature process results in the Cryptographic signature 812 being created. This tamper-evident Optional Component Control table 408 may now be stored as desired, even in a publically-accessible location. The creation process for the Optional Component Control table is now complete, so the Pristine Boot procedure continues 920 with other processing as specified within the TCG Mobile Reference Architecture.

FIG. 10 illustrates the additional processing needed for the task of RIM revocation as described in section 6.3.4.5 of the TCG Mobile Reference Architecture according to the present invention. The specification describes how the RIM_Auth is verified, the RIM_Cert validity list is checked for and all internal RIM_Certs that do not have a corresponding external RIM_Cert on the new validity list are deleted, all the remaining internal RIM_Certs are revalidated, and the counterRIMProtect monotonic counter updated. The process illustrated in FIG. 10 enhances the steps of revalidating all the remaining internal RIM_Certs, updating the counterRIMProtect monotonic counter. First, the Optional Component Control structure is retrieved 1000. Next, in order to be able to verify the data is still valid and untampered, (1002) the public part of the secret key used to create the Cryptographic signature 512 and (1004) the current counterRIMProtect monotonic counter are retrieved from the MTM. (1006) The signature is verified to ensure the data has not been tampered with and the current counterRIMProtect monotonic counter is compared with the RIMProtectValue 802 stored in the Optional Component Control structure (408). If the stored value is greater than or equal to the current monotonic counter value, then the Optional Component Control structure is current, indicating that there has been no reflash or rollback attacks on the structure. (1008) If the results of the two checks show that either the signature is incorrect or that the current monotonic counter is greater than the RIMProtectValue 802 within the Optional Component Control structure (408), then (1010) the RIM revocation process fails and no changes will be made to the installed programs or RIM Certificates. However, if the checks indicate the Optional Component Control structure is valid, then (1012) the RIMProtectValue 802 within the Optional Component Control structure (408) is set to a value one greater than the current value of the counterRIMProtect monotonic counter retrieved at 1004. (1014) The cryptographic signature is produced by the MTM according to the PKCS v1.5 algorithm signed with the secret key retrieved at 1002. Next, tasks as described in the TCG Mobile Reference Architecture specification are performed: (1016) the existing internal RIM Certificates are revalidated with an incremented RIMProtect counter value, then (1018) the counterRIMProtect monotonic counter is incremented to protect both the RIM Certificates and the Optional Component Control structure (408) from rollback or reflash attacks. Finally, (1020) the remaining revocation functions are performed as described in the TCG Mobile Reference Architecture specification.

FIG. 11 illustrates the handling of the communication between the mobile device 1100 and the server 1104 that controls the enabling and disabling of the optional components. In addition, the services requested by the mobile device 1100 from the Mobile Trusted Module 1102 on the device 1100 are also illustrated. First, 1106 the user requests the contract maintenance options stored on the server. In a preferred embodiment, this is performed by establishing an SSL (Secure Socket Layer) session with the server. The server then performs attestation with the device 1108 as defined in the TCG Specification Architecture Overview to verify the identity and trust of the device. The device forwards the requests to the MTM 1110 to enable the MTM to report to the server. Confirmation messages are returned from the MTM 1102 through the device 1112 back to the server 1114. After the attestation successfully completes, the client establishes a shared secret with the server using in a preferred embodiment a Diffie-Hellman key exchange 1116, 1118. Next, the server delivers a customised optional component status page 1120 appropriate for the identified handset. In a preferred embodiment, this is an HTML-based page that the device user interacts with 1122 in order to select which options to add or remove from the device. After the desired changes are made, the device sends a message, including the new enabled or disabled states of each of the optional components, to say the interaction is complete 1124. In a preferred embodiment, this is performed by a POST to an HTTPS page described within the customised options page delivered previously 1120. In another preferred embodiment, the device sends a separate message for each change made by the device user. In another preferred embodiment, the device sends a separate message as soon as each change is made using an AJAX-based mechanism, and the user selects an option that sends a completion message once finished. The server updates its customer database as appropriate and sends to the device the new set of updated Optional Component status flags 1126, encrypted with the key established at 1116 and 1118. These steps correspond to the items labelled 1814, 1816, 1818, 1820 and 1822 in FIG. 18. In a preferred embodiment, the data is in a similar format to the Logical Certificate Label table 814, with pairs of Logical certificate label 804 and Enabled flag 806, and terminated by the pair of values −1 808 and FALSE 810. This is illustrated in FIG. 17, where the Option Component Update table 1700 contains the Logical Certificate Label table 814 as described above, plus a hash of the table 1702 to ensure that the data has not been corrupted during transmission. The device decrypts and verifies the Optional Component Update structure 1128 and if that is successful begins the processing of the options to ensure the enabled and disabled components are correctly configured.

The next task is for the device to re-install each RIM Certificate 1130, repeating for all Internal RIM Certificates, both Success and Fail RIM Certs, present on the device 1132. This activity ensures that the RIM Protect counter value held within the certificate is incremented before the RIM Protect counter is incremented 1146 as otherwise if the counter was incremented first then a system failure occurred before the re-install process could complete, the device may be left in an unbootable state. Once all the existing Internal RIM Certificates have been updated, the current RIM Protect counter value is requested from the MTM 1134, and the value is returned 1136. A new Optional Component Control table is created 1138 using a value one greater than the value of the RIM Protect counter retrieved at 1134 and the status flags from the Optional Component Update structure provided at 1128. A request is made to the MTM 1102 to sign the data 1140 with the signing key generated according to the methods illustrated in FIG. 9. The MTM 1102 returns the signature 1142, so the device stores 1144 this new Optional Component Control table, overwriting the previous table.

In order to protect against rollback or reflash attacks, the device requests the MTM 1102 increment the RIM Protect monotonic counter 1146, and the MTM 1102 acknowledges the success of the operation 1148. Now that all the information on the device associated with optional components has been successfully updated, namely the Optional Component Control structure 408, the appropriate Success RIM Certs 402 and Fail RIM Certs 404 and the counterRIMProtect monotonic counter, the device notifies the server that processing is complete 1150. Finally, the device reboots 1152 to ensure newly-enabled components are operating and disabled components stop running.

As described above, FIG. 8 to FIG. 11 illustrate a preferred embodiment where the Optional Component Control table 408 contains a RIM Protect Value 802 and a Cryptographic signature 812. However, another preferred embodiment for maintaining the enabled or disabled status of the optional components is described below.

FIG. 12 illustrates a preferred embodiment of this data, in the Optional Component Control table 1200, a simplified version of the previously-described Optional Component Control table 808. The Optional Component Control table 1200 is an example of the first mapping. As described above, there is a table with two fields in each row; first an optional trusted component Logical certificate label 804, which uses the same component identifiers as used for the Logical certificate label 600 in the mapIDtoCertTable 508. Next, a flag to indicate whether or not the optional trusted component identified by the Logical certificate label is enabled 806, in which case the flag is set to TRUE, or disabled in which case the flag is set to FALSE. This pair of values is repeated for each optional trusted component in the system, and the table is terminated by a Logical certificate label of −1 808 and a flag conventionally set to FALSE 810, for disabled. Collectively, this set of pairs of values is known as the Logical certificate label table 814.

FIG. 13 illustrates a preferred embodiment of an Optional Component Control RIM Certificate 1300 that is used to maintain the integrity of the Optional Component Control table 1200. This RIM Certificate is created within the device, so it is always an internal RIM Certificate as defined by the TCG Mobile Trusted Module Specification. Within a single device, there is only one such certificate, so the label 1302 is a fixed string; in a preferred embodiment it is set to "OCC_RIMC". In the previous embodiment the RIMProtectValue 802 is used to protect against rollback or reflash attacks, but here the referenceCounter 1304 is used. This field is managed by the MTM, as defined by the TCG Mobile Trusted Module Specification. As this RIM Certificate is never passed to the MTM API MTM_VerifyRIMCertAndExtend, the state 1306 is set such that TPM_PCR_SELECTION is empty, and the measurement-PCRIndex 1308 is set to the value zero. The measurementValue 1310 stores a hash of the Optional Component Control table 1200, with the preferred embodiment using the SHA-1 algorithm to generate the value. There is no need to sign this hash. The field extensionDigestSize 1312 is set to zero and extentionDigest 1314 is not present. In another preferred embodiment, instead of storing the hash in measurementValue 1310 that field is set to zero and instead extentionDigest 1314 stores a hash of the Optional Component Control table 1200 and the extensionDigestSize 1312 holds the size of this hash in bytes. Finally, the integrityCheckSize 1316 and the integrityCheck 1318 store integrity check information as defined by the TCG Mobile Trusted Module Specification.

FIG. 14 illustrates the initial creation of the Optional Component Control table according to the present invention. The process illustrated will occur on the very first boot of the device, once the MTM 102 has initially started up, as detailed in the TCG Mobile Trusted Module Specification for Pristine Boot. As also detailed within that document, Pristine Boot can occur at other times in the mobile device's lifecycle, so FIG. 14 also illustrates the recreation of the structure as required. First, after the Pristine Boot sequence has performed sufficient initialisation to build and initialise the MTM and the roots of trust, there is a check 1400 to see if there is an existing Optional Component Control table 1200. If there is one 1402, then the hash of the structure is calculated 1404 and the Optional Component Control RIM Certificate 1300 is recalled 1406. If the recall was successful and the hash value stored in measurementValue 1310 equals the hash value calculated at 1404 and MTM_VerifyRIMCert returns TPM_SUCCESS to confirm that the structure is current and has not been tampered with 1408, the Pristine Boot procedure continues with other processing 1420 as specified within the TCG Mobile Reference Architecture. If either of the checks at 1402 or 1408 fails, then both the Optional Component Control table 1200 and the Optional Component Control RIM Certificate 1300 are recreated, or created for the very first time. First, a default Optional Component Control table 1200 is created 1410, and the hash of the structure is calculated 1412. An unsigned Optional Component Control RIM Certificate 1300 is created 1414 next, with the measurementValue 1310 set to the hash value calculated at 1412. By calling the MTM API MTM_InstallRIM 1416 with this unsigned certificate, the MTM uses it as a template to create a valid internal RIM Certificate by inserting the current counterRIMProtect value into the referenceCounter 1304 field and generating the integrityCheckData 1318 using a private internal key as described in the TCG Mobile Trusted Module Specification. These two new structures are stored 1418, and the Pristine Boot procedure continues 1420 with other processing as specified within the TCG Mobile Reference Architecture.

FIG. 15 illustrates the additional processing needed for the task of RIM revocation as described in section 6.3.4.5 of the TCG Mobile Reference Architecture according to the present invention. The specification describes how the RIM_Auth is verified, the RIM_Cert validity list is checked for and all internal RIM_Certs that do not have a corresponding external RIM_Cert on the new validity list are deleted, all the remaining internal RIM_Certs are revalidated, and the counterRIMProtect monotonic counter updated. The process illustrated in FIG. 15 enhances the steps of revalidating all the remaining internal RIM_Certs, updating the counterRIMProtect monotonic counter. First, the Optional Component Control table 1200 is retrieved 1500, the hash of the structure is calculated 1502 and the Optional Component Control RIM Certificate 1300 is recalled 1504. If the recall was not successful or the hash value stored in measurementValue 1310 does not equal the hash value calculated at 1502 or MTM_VerifyRIMCert returns a value other than TPM_SUCCESS indicating that the structure is not current or has been tampered with 1506, then the RIM revocation process fails 1508 and no changes will be made to the installed programs or RIM Certificates.

If on the other hand the checks indicate the Optional Component Control table 1200 is valid, then by calling the MTM API MTM_InstallRIM 1510 with the existing certificate retrieved in 1504, the MTM uses it as a template to create a new internal RIM Certificate with an incremented counterRIMProtect value inserted into the referenceCounter 1304 field and then generates the integrityCheckData 1318 using a private internal key as described in the TCG Mobile Trusted Module Specification.

Next, tasks as described in the TCG Mobile Reference Architecture specification are performed: the existing internal RIM Certificates are revalidated 1512 with an incremented RIMProtect counter value, then the counterRIMProtect monotonic counter is incremented 1514 to protect both the trusted component RIM Certificates and the Optional Component Control RIM Certificate 1300 from rollback or reflash attacks. Finally, the remaining revocation functions are performed 1516 as described in the TCG Mobile Reference Architecture specification.

FIG. 16 illustrates the handling of the communication between the mobile device 1600 and the server 1604 that controls the enabling and disabling of the optional components. In addition, the services requested by the mobile device 1600 from the Mobile Trusted Module 1602 on the device 1600 are also illustrated.

First, 1606 the user requests the contract maintenance options stored on the server. In a preferred embodiment, this is performed by establishing an SSL (Secure Socket Layer) session with the server. The server then performs attestation with the device 1608 as defined in the TCG Specification Architecture Overview to verify the identity and trust of the device. The device forwards the requests to the MTM 1610 to enable the MTM to report to the server. Confirmation messages are returned from the MTM 1602 through the device 1612 back to the server 1614. After the attestation successfully completes, the client establishes a shared secret with the server using in a preferred embodiment a Diffie-Hellman key exchange 1616, 1618. Next, the server delivers a customised optional component status page 1620 appropriate for the identified handset. In a preferred embodiment, this is an HTML-based page that the device user interacts with 1622 in order to select which options to add or remove from the device. After the desired changes are made, the device sends a message, including the new enabled or disabled states of each of the optional components, to say the interaction is complete 1624. In a preferred embodiment, this is performed by a POST to an HTTPS page described within the customised options page delivered previously 1620. In another preferred embodiment, the device sends a separate message for each change made by the device user. In another preferred embodiment, the device sends a separate message as soon as each change is made using an AJAX-based mechanism, and the user selects an option that sends a completion message once finished. The server updates its customer database as appropriate and sends to the device the new set of updated Optional Component status flags 1626, encrypted with the key established at 1616 and 1618. These steps correspond to the items labelled 1814, 1816, 1818, 1820 and 1822 in FIG. 18. In a preferred embodiment, the data is in a similar format to the Logical Certificate Label table 814 with pairs of Logical certificate label 804 and Enabled flag 806, and terminated by the pair of values −1 808 and FALSE 810. This is illustrated in FIG. 17, where the Option Component Update table 1700 contains the Logical Certificate Label table 814 as described above, plus a hash of the table 1702 to ensure that the data has not been corrupted during transmission. The device decrypts and verifies the Optional Component Update structure 1628 and if that is successful begins the processing of the options to ensure the enabled and disabled components are correctly configured.

The next task is for the device to re-install each RIM Certificate 1630, repeating for all Internal RIM Certificates, both Success and Fail RIM Certs, present on the device 1632. This activity ensures that the RIM Protect counter value held within the certificate is incremented before the RIM Protect counter is incremented 1646 as otherwise if the counter was incremented first then a system failure occurred before the re-install process could complete the device may be left in an unbootable state. Once all the existing Internal RIM Certificates have been updated, a new Optional Component Control table 1200 is created 1634 using the status flags from the Optional Component Update structure provided at 1628, and the hash of this table is calculated 1636. Next, an unsigned Optional Component Control RIM Certificate 1300 is created 1638, with the measurementValue 1310 set to the hash value calculated at 1636. By calling the MTM API MTM_InstallRIM 1640 with this unsigned certificate, the MTM uses it as a template to create a valid internal RIM Certificate by inserting the current counterRIMProtect value into the referenceCounter 1304 field and generating the integrityCheckData 1318 using a private internal key as described in the TCG Mobile Trusted Module Specification, and the MTM returns the signed structure to the mobile device 1642 and this new structure is stored 1644.

In order to protect against rollback or reflash attacks, the device requests the MTM 1602 increment the RIM Protect monotonic counter 1646, and the MTM 1602 acknowledges the success of the operation 1648. Now that all the information on the device associated with optional components has been successfully updated, namely the Optional Component Control structure 408, the appropriate Success RIM Certs 402 and Fail RIM Certs 404 and the counterRIMProtect monotonic counter, the device notifies the server that processing is complete 1650. Finally, the device reboots 1652 to ensure newly-enabled components are operating and disabled components stop running.

FIG. 18 illustrates another aspect of the current invention, namely the structure of the Server 316 that allows device users to maintain the optional components are enabled or disabled on their device. The key functional elements and data items are as follows. The five blocks Secret generator 1802, Page generator 1808, Option processor 1816, Encrypter 1820 and Transaction committer 1826 are the interface points to external devices, with communication flowing from left to right. First, Secret generator 1802 establishes a Shared key 1804 using a two-way communication protocol 1800 such as Diffie-Hellman. Next, the mobile device requests a contract maintenance web page 1806, so the Page generator 1808 creates one, requesting the current optional component states from the Customer option maintainer 1810, which queries the Customer options database 1812 to find out the current state. After the device user finishes interacting with the generated web page, a completion message is sent to the server 1814 and the Option processor 1816 notifies the Customer option maintainer 1810 of the new options, starting a transaction within the Customer options database 1812. The options are passed to the Optional Component Control table generator 1818, which formats the options into the Optional Component Update table 1700. The Encrypter 1820 encrypts this structure with the Shared key 1804, and returns the structure to the mobile device 1822. Finally, after the mobile device finishes updating all the internal structures, a completion message 1824 is received by the Transaction committer 1826, which notifies the Customer option maintainer 1810 that the outstanding transaction within the Customer options database 1812 is to be committed.

The preceding figures have described how the Optional Component Control table is managed; the following section will describe how it is used during a multi-path secure boot.

FIG. 19 illustrates the present invention, based on the prior art FIG. 1. This figure captures the state of the secure boot process at a moment in time after the core elements such as the RTV+RTM and the MTM interface within the Trusted Area 100 have self-verified. The MTM 102 is the core of this Trusted Area 100, but other key items within this are the Component error states 1900 flags that indicates whether or not each of the components in the secure boot have started up and are operating correctly; the Component error recorder 1902 sets the Component error states 1900 for the appropriate components; the Launcher 108 that is responsible for launching the next component that is to be added to the Trusted Area 100; the Certificate lookup 1904 that looks up the required Success RIM Cert 114 or Fail RIM Cert 1906 according to the Map label to cert table 1908, the Optional component control table 1910 and the Component error states 1900. The Certificate lookup 1904 is an example of a looking up unit. The Launcher 108 is an example of a calculating unit, a verifying unit, an updating unit, and an executing unit in the case of executing a Trusted component 1 116. The Certificate lookup 1904 is also an example of a calculating unit, a verifying unit, an updating unit, and an executing unit in the case where the executed component (for example, the Trusted component 1 116 successfully executed) executes the next component. The Map label to cert table 1908 is an example of the second mapping. The Optional component control table 1910 is an example of the first mapping. The Fail RIM Certs 1906 describe the expected platform states during a secure boot where one or more components have failed to operate correctly. The Optional component control table 1910 contains the data described by the Logical certificate label table 814 and stored in an integrity-protected container as illustrated in FIG. 8 and FIG. 12. In other words, the Map label to cert table 1908, which is an example of the second mapping and the Optional component control table 1910, which is an example of the first mapping, are provided by a providing unit (or stored in a storage unit, not shown).

The Fail sequencer 1918 uses the Next component table 1912 and the Component error states 1900 to choose which component to launch next and is described in detail in FIG. 24. The Fail sequencer 1918 is an example of the calculating unit, the verifying unit, updating unit, and the executing unit in the case where execution of the component is failed. These RIM Certificates 114 and 1906, the Next component table 1912, the Optional component control table 1910, and the Map label to cert table 1908 should be integrity protected, so are placed in the set of Integrity protected 112 data items. The Next component table 1912 is an example of the third mapping. Note that as with FIG. 1, integrity protection is an intrinsic property of the data rather than being an extrinsic property. Also note that the formats of Success RIM Certs 114 and Fail RIM Certs 1906 are identical; the key difference is the roles they are assigned according to the Map ID to cert table 1908; other than based on that table, it is impossible to distinguish between the two, and indeed there is no need to make that distinction.

The purpose of the secure boot with optional components is to expand the Trusted Area 100 to encompass if possible all additional components Trusted component 1 116, Trusted component 2 118 and Trusted component 3 120, but if any components fail to start up, the Trusted Area 100 will not expand to cover them. The dotted line from Launcher 108 through Trusted component 1 116, Trusted component 2 118, and Trusted component 3 120 labelled 122, 124 and 126 indicates the normal execution path according to one aspect of the prior art. According to another aspect of the prior art, further trusted components may be present, with the operating system (not shown) as the final trusted component. The heavier line from Trusted component 1 116, Fail sequencer 1918, and Trusted component 3120 labelled 1914 and 1916 indicates that according to one aspect of the present invention, if Trusted component 2 118 fails to start up or is marked disabled in the Optional Component Control table 1910, an alternative execution path is available.

FIG. 20 illustrates the new secure boot outcomes that result from the present invention. The components available are as described in FIG. 2, and the expected successful outcome 208 is of course one valid outcome. However, in place of the failure condition 212, the new flow 2000 is able to skip over the failing or disabled Trusted component 4 200 and continue on with Trusted component 5 202 to produce a functioning trusted area 2002, but with limited capabilities. Similarly, flow 2004 illustrates the case where both Trusted component 2 118 and Trusted component 5 202 fail to operate correctly or are marked disabled in the Optional Component Control table 1910, producing another functioning trusted area 2006, but also with limited capabilities. In the trusted area diagrams 208, 2002 and 2006, TC1 represents Trusted component 1 116, TC2 represents Trusted component 2 118, TC3 represents Trusted component 3 120, TC4 represents Trusted component 4 200, TC5 represents Trusted component 5 202, and OS represents Operating System 204. All components depend on the MTM 102, and in addition Trusted component 2 118 depends on Trusted component 1 116, and Trusted component 4 200 and Trusted component 5 202 depend on Trusted component 3 120. The Operating System 204 depends on Trusted component 1 116 and Trusted component 3 120. Shaded parts Shows the components which can not used.

FIG. 21A to FIG. 24 illustrates the control flow sequencing between the key parts of the secure boot system according to the present invention. The secure boot system according to the present invention performs a method of executing a software component verifiable against integrity measurements. First, in FIG. 21A according to the prior art, the system starts on Power On 2100, then proceeds to perform the basic boot of the system 2102, initialize the RTV, RTM, MTM, etc. 2104, request RIM Certificate for Trusted Area self-validation 2108, and if not found, then there has been a fatal error so all the device can do is enter a fail state 2132. If found 2110 extend that RIM Certificate into the MTM 2112, by concatenating a subset of PCRs specified within the RIM Certificate. If the extend operation fails 2114, then there has been a fatal error so all the device can do is enter a fail state 2132. Otherwise, the integrity of the key data tables needs to be verified. For the Next component table 1912 and Map label to cert table 1908, as they are protected by the extensionDigest field 504 of a RIM Certificate 500, the validity of that hash can be checked, then the MTM API MTM_VerifyRIMCert used to verify the integrity 2116 of the REM Certificate 500 itself. For the Optional component control table 1910, the verification process 2118 is described in FIG. 21B and FIG. 21C, as the two embodiments of the table need different verification procedures. If either of the verification operations fail 2120, then there has been a fatal error so all the device can do is enter a fail state 2132. One ordinarily-skilled in the an will see that there are other implementations of this verification process possible, such as performing the verification before every use of the tables in the following sequence.

Next, Request RIM Certificate for Trusted Component 1, verification 2122 obtains a RIM Certificate that describes the expected current state and the expected state of Trusted Component 1 116. In other words, the first mapping (the Optional Component Control table 408 or 1200) is looked up for a given logical identifier identifying the software component (Trusted Component 1 116) to get a status flag indicating whether the software component is enabled. Then, the second mapping (mapIptoCenTable 508) is looked up for a given logical identifier identifying the software component's verification certificate and the previous component statuses to get an integrity measurement certificate (RIM Certificate) 2126. If the RIM Certificate is not returned 2124, the CPU will pass control to the Fail sequencer 2134 with an indicator to indicate that there was an error retrieving the RIM Certificate for Trusted Component 1, to allow the Fail sequencer to process the error. In other words, if the component is not enabled, the Fail sequencer processes the error. This processing is described in FIG. 24 below. One, possible reason for failure is that when requesting the RIM Certificate in 2122, the Certificate lookup process 1904 refers to the Optional component control table 1910 and notes that the component corresponding to the requested RIM Certificate is disabled, so it returns a distinct error code to indicate that the RIM Certificate requested corresponds to a disabled component.

This Trusted Component has its hash value calculated 2126, and there is a check if the calculated value equals the value stored in the RIM Certificate 2128. In other words, check value (hash value) of the software component (Trusted Component 1 116) to execute is calculated 2126. Next, it is verified that the integrity measurement matches integrity measurement value within the integrity measurement certificate and that the calculated check value matches check value within the integrity measurement certificate (the RIM Certificate requested) 2128. If the hash values are not equal, they are indicating that there is a problem with the component such as accidental or deliberate corruption. Then, the CPU will pass control to the Fail sequencer 2136 with an indicator to indicate that there was a hash error for Trusted Component 1, to allow the Fail sequencer to process the error. In other words, if the verification is unsuccessful, the Fail sequencer processes the error. This processing is described in FIG. 24 below. If the hash values are equal, then the Component error recorder records that the hash checking for this component was successful 2130. The processing continues on FIG. 22.

FIG. 21B illustrates the details of the Verify Optional Component Control table 2118 step, when the embodiment of the Optional Component Control table is as illustrated in FIG. 8, for verifying that the Optional Component Control table 1910 is valid. First, the public part of the secret key for verifying the signature on the Optional Component Control table is retrieved 2150. If the key is not found 2152, then an error has occurred and an error code is returned to the calling process 2154. If the key is present, next the Optional Component Control table is retrieved 2156. If it does not exist 2158, then an error has occurred and an error code is returned to the calling process 2154. Now, the counterRIMProtect monotonic counter value is retrieved 2160, and the Optional Component Control table is verified 2162. This includes both checking that the calculated signature matches the stored signature to detect tampering, and that the stored RIMProtectValue 802 is greater than or equal to the recalled monotonic counter value. If this fails 2164, then an error has occurred and an error code is returned to the calling process 2154. If it succeeds, the Optional Component Control table is valid and a success code is returned to the calling process 2166 and the secure boot process continues as described in FIG. 21A.

FIG. 21C illustrates the details of the Verify Optional Component Control table 2118 step, when the embodiment of the Optional Component Control table is as illustrated in FIG. 12 and FIG. 13, for verifying that the Optional Component Control table 1910 is valid. First, the RIM Certificate that protects the Optional Component Control table is retrieved 2170. If it is not found 2172, then an error has occurred and an error code is returned to the calling process 2174. Next the Optional Component Control table is retrieved 2176. If it does not exist 2178, then an error has occurred and an error code is returned to the calling process 2174. Otherwise, the hash of the Optional Component Control table 1200 is calculated 2180, and the result is compared with the reference hash value 2182 stored within the Optional Component Control table's RIM Certificate. If they do not match 2184, then an error has occurred and an error code is returned to the calling process 2174. Next, the MTM is requested to perform the MTM's API MTM_VerifyRIMCert on the Optional Component Control table's RIM Certificate 2186 to ensure that the certificate itself is valid. If the API returns an error code 2188, then an error has occurred and an error code is returned to the calling process 2174. If it succeeds, the Optional Component Control table is valid and a success code is returned to the calling process 2190 and the secure boot process continues as described in FIG. 21A.

FIG. 22 illustrates further handling of the secure boot sequence. The previously-obtained RIM Certificate is extended into the MTM 2200 by appending a value defined in this RIM Certificate into a PCR defined in this RIM Certificate according to the prior art. In other words, current integrity measurement'is updated 2200 to include an indication of the check value within the integrity measurement certificate if the status flag indicates that the software component is enabled and the verification 2128 is successful. The result of extend operation is checked 2202 to see if this extend worked correctly. If not, the CPU will pass control to the Fail sequencer 2204, to allow the Fail sequencer to process the error. This processing is described in FIG. 24 below. If the hash value is extended correctly, this indicates that the component can be fully trusted by the Trusted Area, so the Trusted Component 1 is launched 2206, and control is passed to this new component. In other words, the software component is executed 2206 if the software component is enabled and the verification is successful.

The first processing is for the Trusted Component to initialize 2208, which performs the required initialization for the component and any hardware, etc. that this component may control. The component self-checks that it has initialized successfully 2210, and if there was an error, the Trusted Component will pass control to the Fail sequencer 2212 with an error code to indicate that the current Trusted Component failed to initialize, to allow the Fail sequencer to process the error. This processing is described in FIG. 24 below. If there was no error, the Component error recorder 2214 records that the initialization for this component was successful. Next, the Trusted Component requests a RIM Certificate for self-validation 2216, to obtain a RIM Certificate that describes the expected current state and a given value to extend into a given PCR. If the requested RIM Certificate is not found 2217, the Trusted Component will pass control to the Fail sequencer 2212 with an error code to indicate that the current Trusted Component failed to initialize, to allow the Fail sequencer to process the error. This processing is described in FIG. 24 below. Otherwise, the RIM Certificate is extended 2218 into the MTM according to the prior art, and the success or otherwise of the extend operation is checked 2220. If the extend operation failed, the Trusted Component will pass control to the Fail sequencer 2222 with an error code to indicate that the current Trusted Component failed to self-validate, to allow the Fail sequencer to process the error. This processing is described in FIG. 24 below. If the value extended correctly, the current Trusted Component continues to perform other tasks 2224 as required. The processing continues on FIG. 23.

FIG. 23 illustrates yet further handling of the secure boot sequence. First, there is a check to see if there are any more Trusted Components to load 2300, and if not, the secure boot has been completed successfully 2302. Note that in this embodiment, if verification of an optional component has been failed this optional component has not been booted. So, in the step 2302, even if the secure boot has been completed successfully, some optional components may not be booted. In one embodiment this is not an actual check; the last component in the load sequence, in one embodiment the operating system, is implemented such that it does not look for another component after completing other tasks 2224 it is defined to perform. If there are other components to launch, a RIM Certificate for verification of the next Trusted Component is requested 2304. Here, the next Trusted Component means the Trusted Component which should be booted next. If the RIM Certificate is not returned 2305, the CPU will pass control to the Fail sequencer 2322 with an indicator to indicate that there was an error retrieving the RIM Certificate for the next Trusted Component, to allow the Fail sequencer to process the error. This processing is described in FIG. 24 below. One possible reason for failure is that when requesting the RIM Certificate in 2304, the Certificate lookup process 1904 refers to the Optional component control table 1910 and notes that the component corresponding to the requested RIM Certificate is disabled, so it returns a distinct error code to indicate that the RIM Certificate requested corresponds to a disabled component.

The Trusted Component has its hash value calculated 2306 in the same manner as described in the RIM Certificate in Calculate hash for next Trusted Component, then a check is performed 2308 to see if this calculated hash value equals the hash value stored within the next Trusted Component's RIM Certificate. If they are not, indicating that there is a problem with the component such as accidental or deliberate corruption, the Trusted Component will pass control to the Fail sequencer 2310 with an error code to indicate that the hash of the next Trusted Component did not validate, to allow the Fail sequencer to process the error. This processing is described in FIG. 24 below. If the hash values are equal, the Component error recorder records that the hash check for the next Trusted Component was successful 2312. Next, this RIM Certificate is extended into the MTM 2314 according to the prior art, and the success or otherwise of the extend operation 2316 is checked. If the extend operation failed, the Trusted Component will pass control to the Fail sequencer 2318 with an error code to indicate that the extend into the MTM of the next Trusted Component failed, to allow the Fail sequencer to process the error. This processing is described in FIG. 24 below. If instead the hash value extended correctly, this indicates that the next Trusted Component can be fully trusted by the Trusted Area, so it will be launched 2320, and the processing will be repeated from step 2208.

FIG. 24 illustrates the Fail sequencer operation according to the present invention. First, the passed-in error code is recorded 2400 in the Component error states 1900. For example, if the status flag indicates that the software component is not enabled 2134, the second mapping (mapIDtoCertTable 508) is looked up for a given logical identifier identifying the component's verification failure certificate and the previous component statuses to get a disabled integrity measurement certificate (Fail RIM Certs 404). Next, current integrity measurement is updated to include an indication of disabled component status stored within the disabled integrity measurement certificate. If the verification is unsuccessful 2136, the second mapping (mapIDtoCertTable 508) is looked up for a given logical identifier identifying the component's verification failure certificate and the previous component statuses to get a failure integrity measurement certificate (Fail RIM Certs 404). Then, current integrity measurement is updated to include an indication of unsuccessful integrity measurement stored within the failure integrity measurement certificate.

Next, all the current component error states are retrieved 2402 from the Component error states 1900 which are then used to look up the Next component table 1912 to find the next Trusted Component 2404 that should be launched. In other words, the third mapping (Next component table 1912) is looked up for a given logical identifier identifying the component and the previous component statuses to get an alternative software component to be executed. A check is made to see if there is a defined next component 2406, and if not, the secure boot will enter a fail state 2408 and the device will fail to start up in the normal secure fashion. If there is a next Trusted Component, then Request RIM Certificate for next Trusted Component verification 2410 obtains a Fail RIM Cert that describes the expected current state and the expected state of the next Trusted Component. Here, the next Trusted Component means the Trusted Component which should be booted next. If the RIM Certificate is not returned 2411, the CPU will pass control to start of the Fail sequencer 2428 with an indicator to indicate that there was an error retrieving the RIM Certificate for the next Trusted Component, to allow the Fail sequencer to process the error. If the RIM Certificate is successfully returned, the next Trusted Component has its hash value calculated 2412, and the calculated hash value is compared with the hash value within the RIM Certificate 2414. If they are not equal, indicating that there is a problem with the component such as accidental or deliberate corruption, the Fail sequencer will pass control back to the start of Fail sequencer 2416 with an error code to indicate that the hash of the next Trusted Component did not validate, to allow the Fail sequencer to process the error. If the hash values are equal, then the Component error recorder records that the hash check for the next Trusted Component was successful 2418. Next, this RIM Certificate is extended into the MTM 2420 according to the prior art, and the success or otherwise of the extend operation is checked 2422. If the extend operation failed, the Fail sequencer will pass control back to the start of Fail sequencer 2426 with an error code to indicate that the extend of the next Trusted Component did not succeed, to allow the Fail sequencer to process the error. If the hash value extends correctly, this indicates that the next Trusted Component can be fully trusted by the Trusted Area, so the next additional component is launched 2424, and as indicated the control flow continues with Trusted Component initializes 2208 above.

It should be noted that although the present invention is described based on aforementioned embodiment, the present invention is obviously not limited to such embodiment. The following cases are also included in the present invention.

(1) In the case of a virtualization environment, in one embodiment a hypervisor is the final trusted component that executes. In another embodiment other trusted components, such as operating systems, execute after the hypervisor trusted component executes.

(2) In aforementioned embodiment, the verification of each component is performed before each of them is launched. However, present invention can be applied to a system in which the verifications are performed after the each of the components is launched. In that case, the system stops each component if the verification for the component is failed.

(3) In aforementioned embodiment, the verification is performed in a similar manner to the TCG specifications. However, present invention can be applied to another verification system, as long as, the verification system can verify the components of the system using a verification method in which the component are verified like a chain (i.e. one component verifies another component which launch after the one component). For example, extending the hash value into MTM may be omitted, because this operation is specific for TCG specification.

(4) In aforementioned embodiment, the verification is performed by using hash values in a certificate (RIM Cert). However, another verification method which does not use hash values may be applied to present invention.

Conventional check sum or another data extracted from the component (for example, a first predetermined bits extracted from the component) may be used to perform verification. Furthermore, the certificate may be replaced to a data group which includes the integrity check values.

And, the verification method is not limited to check whether or not a value extracted from the component and an expected value match. For example, checking the size of the component, and if the size is larger or smaller than a predetermined amount the component may be judged to be verified. These verification methods are not as strict as comparing a hash value with its expected value, however they are faster to perform.

(5) Each of aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer.

(6) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as an individual chip, or as a single chip to include a part or all thereof.

Furthermore, here, System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears thorough progress in semiconductor technology or other derived technology, that technology can naturally be used to carry out integration of the constituent elements. Biotechnology is anticipated to apply.

(7) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and the so on. The IC card or the module may also be included in the aforementioned super-multi-function LSI. The IC card or the module achieves its function through the micro-processor's operation according to the computer program. The IC card or the module may also be implemented to be tamper-resistant.

(8) The present invention, may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

(9) Those skilled in the art will readily appreciate that many modifications are possible in the exemplary embodiment without materially departing from the novel teachings and advantages of this invention. Accordingly, arbitrary combination of the aforementioned modifications and embodiment is included within the scope of this invention.

INDUSTRIAL APPLICABILITY

The present invention is applicable to information and telecommunication apparatuses and household electrical appliances for which program data is updated, such as personal computers, mobile phones, audio players, televisions, and video recorders.

REFERENCE SIGNS LIST

100 Trusted area
102 MTM
108 Launcher
112, 400 Integrity protected
114, 402 Success RIM Cert
116 Trusted component 1
118 Trusted component 2
120 Trusted component 3
404, 1906 Fail RIM Cert
406, 1908 Map label to cert table
408, 1200, 1910 Optional component control table
410 Default optional component control table
1900 Component error state
1902 Component error recorder
1904 Certificate lookup 1912 Next component table
1918 Fail sequencer

The invention claimed is:

1. A method for executing a predetermined software component which is verifiable against integrity measurements, the method comprising:
   a) providing a first mapping from logical identifiers to software component enabled status flags;
   b) providing a second mapping from the logical identifiers and previous software component statuses information to actual integrity measurement certificates containing verification data;
   c) looking up the first mapping for a given logical identifier identifying the predetermined software component to get a status flag indicating whether the predetermined software component is enabled;
   d) if the status flag indicates that the predetermined software component is not enabled,
      i) looking up the second mapping for a given logical identifier identifying a verification failure certificate of the predetermined software component and previous statuses of the predetermined software component to get a disabled integrity measurement certificate, and
      ii) updating a current integrity measurement to include an indication of a disabled status of the predetermined software component, the current integrity measurement being stored within the disabled integrity measurement certificate; and
   e) if the status flag indicates that the predetermined software component is enabled,
      i) looking up the second mapping for a given logical identifier identifying a verification certificate of the predetermined software component and the previous statuses of the predetermined software component to get an integrity measurement certificate,
      ii) calculating a check value of the predetermined software component,
      iii) verifying that an integrity measurement value of the predetermined software component matches an integrity measurement value stored within the integrity measurement certificate and that the calculated check value of the predetermined software component matches a check value stored within the integrity measurement certificate,
      iv) updating, if the verification is successful, a current integrity measurement to include an indication of the check value, the current integrity measurement being stored within the integrity measurement certificate, and
      v) executing the predetermined software component if the verification is successful.

2. The method according to claim 1, further comprising
   f) the predetermined software component is not enabled or the verification is unsuccessful,
      i) providing a third mapping from the logical identifiers and the previous software component statuses information to component identifiers,
      ii) looking up the third mapping for a given logical identifier identifying the predetermined software component and the previous software component statuses to get a logical identifier identifying an alternative software component,
      iii) looking up the second mapping for the logical identifier identifying the alternative software component and the previous software component statuses to get an integrity measurement certificate of the alternative software component,
      iv) calculating a check value of theses alternative software component,
      v) verifying that an integrity measurement value of the alternative software component matches an integrity measurement value stored within the integrity measurement certificate of the alternative software component and that the calculated check value of the alternative software component matches a check value stored within the integrity measurement certificate of the alternative software component,
      vi) updating, if the verification of the alternative software component is successful, a current integrity measurement to include an indication of the check value of the alternative software component, the current integrity measurement being stored within the integrity measurement certificate of the alternative software component, and
      vii) executing the alternative software component if the verification of the alternative software component is successful.

3. An apparatus for executing a predetermined software component, which is verifiable against integrity measurements, the apparatus comprising:
   a) a providing unit configured to provide a first mapping from logical identifiers to software component enabled status flags and a second mapping from the logical identifiers and previous software component statuses information to actual integrity measurement certificates containing verification data;
   b) a looking up unit configured to look up the first mapping for a given logical identifier identifying the predetermined software component to get a status flag indicating whether the predetermined software component is enabled, and to look up the second mapping for a given logical identifier identifying a verification certificate of the predetermined software component and previous statuses of the predetermined software component to get an integrity measurement certificate if the status flag indicates that the predetermined software component is enabled;
   c) a calculating unit configured to calculate a check value of the predetermined software component if the status flag indicates that the predetermined software component is enabled;
   d) a verifying unit configured to verify that an integrity measurement value of the predetermined software component matches an integrity measurement value stored within the integrity measurement certificate and that the calculated check value of the predetermined software component matches a check value stored within the integrity measurement certificate if the status flag indicates that the predetermined software component is enabled;
   e) an updating unit configured to update, if the status flag indicates that the predetermined software component is enabled and the verification is successful, a current integrity measurement to include an indication of the check value, the current integrity measurement being stored within the integrity measurement certificate; and
   f) an executing unit configured to execute the predetermined software component if the status flag indicates that the predetermined software component is enabled and the verification is successful, wherein, if the status flag indicates that the predetermined software component is not enabled,
  i) the looking up unit is configured to look up the second mapping for a given logical identifier identifying a verification failure certificate of the predetermined software component and the previous statuses of the software component to get a disabled integrity measurement certificate, and
  ii) the updating unit is configured to update a current integrity measurement to include an indication of a disabled status of the predetermined software component, the current integrity measurement being stored within the disabled integrity measurement certificate.

4. The apparatus according to claim 3, wherein the apparatus is configured as an integrated circuit.

5. A method for executing a predetermined software component, which is verifiable against integrity measurements, the method comprising:
  a) providing a first mapping from logical identifiers to software component enabled status flags;
  b) providing a second mapping from the logical identifiers and previous software component statuses information to actual integrity measurement certificates containing verification data;
  c) looking up the first mapping for a given logical identifier identifying the predetermined software component to get a status flag indicating whether the predetermined software component is enabled;
  d) looking up the second mapping for a given logical identifier identifying a verification certificate of the predetermined software component and previous statuses of the predetermined software component to get an integrity measurement certificate;
  e) calculating a check value of the predetermined software component;
  f) verifying that an integrity measurement value of the predetermined software component matches an integrity measurement value stored within said integrity measurement certificate and that the calculated check value of the predetermined software component matches a check value stored within the integrity measurement certificate;
  g) if the verification is unsuccessful,
    i) looking up the second mapping for a given logical identifier identifying a verification failure certificate of the predetermined software component and the previous statuses of the predetermined software component to get a failure integrity measurement certificate, and
    ii) updating a current integrity measurement to include an indication of an unsuccessful integrity measurement, the current integrity measurement being stored within the failure integrity measurement certificate; and
  h) if the verification is successful,
    i) updating, if the status flag indicates that the predetermined software component is enabled, a current integrity measurement to include an indication of the check value, the current integrity measurement being stored within the integrity measurement certificate; and
    ii) executing the predetermined software component if the status flag indicates that the predetermined software component is enabled.

6. A non-transitory computer readable recording medium storing computer software code which causes a computer to perform a method for executing a predetermined software component which is verifiable against integrity measurements, the method comprising:
  a) providing a first mapping from logical identifiers to software component enabled status flags;
  b) providing a second mapping from the logical identifiers and previous software component statuses information to actual integrity measurement certificates containing verification data;
  c) looking up the first mapping for a given logical identifier identifying the predetermined software component to get a status flag indicating whether the predetermined software component is enabled;
  d) if the status flag indicates that the predetermined software component is not enabled,
    i) looking up the second mapping for a given logical identifier identifying a verification failure certificate of the predetermined software component and previous statuses of the predetermined software component to get a disabled integrity measurement certificate, and
    ii) updating a current integrity measurement to include an indication of a disabled status of the predetermined software component, the current integrity measurement being stored within the disabled integrity measurement certificate; and
  e) if the status flag indicates that the predetermined software component is enabled
    i) looking up the second mapping for a given logical identifier identifying a verification certificate of the predetermined software component and the previous statuses of the predetermined software component to get an integrity measurement certificate,
    ii) calculating a check value of the predetermined software component,
    iii) verifying that an integrity measurement value of the predetermined software component matches an integrity measurement value stored within the integrity measurement certificate and that the calculated check value of the predetermined software component matches a check value stored within the integrity measurement certificate,
    iv) updating, if the verification is successful, a current integrity measurement to include an indication of the check value, the current integrity measurement being stored within the integrity measurement certificate, and
    v) executing the predetermined software component if the verification is successful.

7. An apparatus for executing a predetermined software component, which is verifiable against integrity measurements, the apparatus comprising:
  a) a providing unit configured to provide a first mapping from logical identifiers to software component enabled status flags and a second mapping from the logical identifiers and previous software component statuses information to actual integrity measurement certificates containing verification data;
  b) a looking up unit configured to look up the first mapping for a given logical identifier identifying the predetermined software component to get a status flag indicating whether the predetermined software component is enabled and to look up the second mapping for a given logical identifier identifying a verification certificate of the predetermined software component and previous statuses of the predetermined software component to get an integrity measurement certificate;

c) a calculating unit configured to calculate a check value of the predetermined software component;
d) a verifying unit configured to verify that an integrity measurement value of the predetermined software component matches an integrity measurement value stored within the integrity measurement certificate and that the calculated check value of the predetermined software component matches a check value stored within the integrity measurement certificate;
e) an updating unit configured to update, if the verification is successful and the status flag indicates that the predetermined software component is enabled, a current integrity measurement to include an indication of the check value, the current integrity measurement being stored within the integrity measurement certificate; and
f) an executing unit configured to execute the predetermined software component if the verification is successful and the status flag indicates that the predetermined software component is enabled, wherein, if theses verification is unsuccessful,
  i) the looking up unit is configured to look up the second mapping for a given logical identifier identifying a verification failure certificate of the predetermined software component and the previous statuses of the predetermined software component to get a failure integrity measurement certificate, and
  ii) the updating unit is configured to update a current integrity measurement to include an indication of an unsuccessful integrity measurement, the current integrity measurement being stored within the failure integrity measurement certificate.

* * * * *